(12) United States Patent
Monnoyer

(10) Patent No.: US 12,209,903 B2
(45) Date of Patent: Jan. 28, 2025

(54) METHOD AND APPARATUS FOR CALIBRATING A SPECTRAL IMAGING DEVICE

(71) Applicant: TEKNOLOGIAN TUTKIMUSKESKUS VTT OY, Espoo (FI)

(72) Inventor: Philippe Monnoyer, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 18/700,225

(22) PCT Filed: Oct. 11, 2022

(86) PCT No.: PCT/FI2022/050675
§ 371 (c)(1),
(2) Date: Apr. 10, 2024

(87) PCT Pub. No.: WO2023/062275
PCT Pub. Date: Apr. 20, 2023

(65) Prior Publication Data
US 2024/0410752 A1 Dec. 12, 2024

(30) Foreign Application Priority Data
Oct. 12, 2021 (FI) .................. 20216056

(51) Int. Cl.
*G01J 3/26* (2006.01)
*G01J 3/02* (2006.01)
*G01J 3/28* (2006.01)

(52) U.S. Cl.
CPC .............. *G01J 3/0297* (2013.01); *G01J 3/26* (2013.01); *G01J 3/2823* (2013.01)

(58) Field of Classification Search
CPC .......... G01J 3/2823; G01J 3/26; G01J 3/0297; G01N 21/274
See application file for complete search history.

(56) References Cited

U.S. PATENT DOCUMENTS

| 10,444,071 | B1 | 10/2019 | Pratt |
| 2002/0154300 | A1 | 10/2002 | Mansfield et al. |

(Continued)

FOREIGN PATENT DOCUMENTS

| CN | 103268499 A | 1/2013 |
| CN | 207528342 U | 8/2017 |

(Continued)

OTHER PUBLICATIONS

International Search Report and Written Opinion in Application No. PCT/FI2022/050675, mailed Dec. 5, 2022.

(Continued)

*Primary Examiner* — Maurice C Smith
(74) *Attorney, Agent, or Firm* — Meunier Carlin & Curfman LLC

(57) ABSTRACT

Method for calibrating a spectral imaging device comprises forming first calibration light by illuminating a first calibration region of a calibration sample with illuminating light, forming second calibration light by illuminating a second calibration region of the calibration sample with the illuminating light, measuring a first spectrum of the first calibration light by using the spectral imaging device, measuring a second spectrum of the second calibration light by using the spectral imaging device, and determining or verifying a spectral calibration function of the spectral imaging device by comparing the measured spectra with reference spectra. The spectral calibration function specifies a relation, which associates values of a control parameter with actual spectral positions. The first calibration light has a first spectral peak (Continued)

at a first peak wavelength, and the second calibration light has a second spectral peak at a second peak wavelength.

13 Claims, 14 Drawing Sheets

(56) References Cited

U.S. PATENT DOCUMENTS

| | | |
|---|---|---|
| 2009/0152454 A1 | 6/2009 | Nelson et al. |
| 2013/0044200 A1 | 2/2013 | Brill et al. |
| 2014/0176729 A1 | 6/2014 | Saari et al. |
| 2018/0045565 A1 | 2/2018 | Pratt |
| 2020/0182698 A1 | 6/2020 | Jang et al. |

FOREIGN PATENT DOCUMENTS

| | | | |
|---|---|---|---|
| CN | 109974854 A | 3/2019 | |
| EP | 2720014 A1 * | 4/2014 | ............ G01J 3/0208 |
| EP | 1931262 B1 | 11/2016 | |
| WO | 2018194985 A1 | 10/2018 | |
| WO | 20210099568 A1 | 5/2021 | |

OTHER PUBLICATIONS

Pisani, M., et al: "Compact imaging spectrometer combining Fourier transform spectroscopy with a Fabry-Perot interferometer References and links", Opt. Eng. Appl. Opt. Express, vol. 17, No. 10, May 11, 2009 (May 11, 2009), pp. 8319-8331.
Search report from Finnish Patent and Registration Office in Application 20216056, mailed May 31, 2022 2p.
Communication of acceptance from Finnish Patent and Registration Office in Application 20216056, mailed Feb. 21, 2024.

* cited by examiner

METHOD AND APPARATUS FOR CALIBRATING A SPECTRAL IMAGING DEVICE

CROSS REFERENCES

This application is a U.S. National Stage Application of international application PCT/FI2022/050675 filed on Oct. 11, 2022 and claiming priority to Finnish national application No. 20216056 filed on Oct. 12, 2021.

FIELD

Some embodiments relate to calibrating a spectral imaging device.

BACKGROUND

It is known to calibrate a hyperspectral imaging device by using a broadband light source and a scanning monochromator to form calibration light at an adjustable wavelength. The spectral scale of the hyperspectral imaging device may be subsequently calibrated by using the hyperspectral imaging device for measuring a spectrum of the calibration light, and by comparing the measured spectrum with the known adjustable wavelength of the scanning monochromator. However, calibration by using the scanning monochromator may be time-consuming and may require use of special equipment in a laboratory.

Ageing of the hyperspectral imaging device may cause a need to re-calibrate the spectral scale of the hyperspectral imaging device. Consequently, the hyperspectral imaging device needs to be sent to a calibration laboratory, again.

SUMMARY

An object is to provide a method for spectral calibration of a spectral imaging device. An object is to provide an apparatus for spectral calibration of a spectral imaging device. An object is to provide a method for enabling or disabling a functionality of a spectral imaging device. An object is to provide an apparatus for enabling or disabling a functionality of a spectral imaging device.

According to an aspect, there is provided a method according to claim 1.

Other aspects are defined in the other claims.

The scope of protection sought for various embodiments of the invention is set out by the independent claims. The embodiments, if any, described in this specification that do not fall under the scope of the independent claims are to be interpreted as examples useful for understanding various embodiments of the invention.

For accurate measurements, the spectral imaging device may need to be calibrated. The present method utilizes a low-cost calibration sample, which may be implemented by forming a plurality of calibration regions on a carrier layer. The calibration regions may be e.g. fluorescent regions implemented by printing with fluorescent inks. The calibration regions may be implemented e.g. by printing with quantum dot inks. Yet, the calibration regions may comprise reflection holograms. The carrier layer may be e.g. a plastic layer of a cardboard layer.

Each calibration region may form calibration light when illuminated with suitable illuminating light. The calibration light may have a spectral peak at a fixed wavelength, which may be substantially independent of the illumination geometry, and substantially independent of the spectrum of the illuminating light. The illuminating light may be obtained e.g. from a light emitting diode of a normal household luminaire. The illuminating light may be obtained e.g. from a flash lamp of a mobile phone.

In an embodiment, the spectral imaging device may be implemented in a mobile phone. The illuminating light may be obtained e.g. from a flash lamp of the mobile phone.

The calibration sample allows a user to perform a calibration himself, without a need to use laboratory equipment. The user may calibrate the spectral imaging device by using the calibration sample. The user may calibrate the spectral imaging device in a short time. The user may perform the calibration before measuring a spectrum of an object and/or after measuring a spectrum of an object. The user may perform a calibration e.g. in order to compensate spectral drift caused by ageing of the spectral imaging device. The user may perform a calibration e.g. in order to compensate spectral drift caused by a change of operating temperature of the spectral imaging device. A calibration may be performed to compensate drift caused by one or more of the following factors: change of operating temperature, change of pressure, change of humidity, change of composition of ambient air (or gas).

Calibration of mobile hyperspectral cameras during mass production may represent a high cost. The calibration sample may allow an end user (e.g. a consumer) to perform the calibration himself. The calibration sample may comprise holographic or fluorescent regions to allow the calibration by the product owner.

In an embodiment, the calibration sample may be manufactured at low costs. The calibration sample may comprise e.g. fluorescent ink deposited on a plastic card. The achievable manufacturing costs per single calibration sample may be e.g. less than 0.1 USD.

In an embodiment, the calibration sample may comprise a machine-readable code e.g. for secure identification of the device owner for a sensitive application of the spectral imaging device. The sensitive application may be a confidential application. The sensitive application may be e.g. a medical application related to the health or medical condition of the user. The sensitive application may be e.g. a personal service provided by a service provider.

The calibration sample may be e.g. a printed item, which provides specific spectral reflectivity bands that are independent of the ambient illuminating light. The calibration sample may be presented to an uncalibrated spectral imaging device. The spectral imaging device may measure spectra from the calibration sample, and the spectral imaging device may adjust the spectral calibration function by comparing the measured spectra with reference spectra.

For example, the spectral scale of a hyperspectral camera may depend on operation of a scanning Fabry-Perot interferometer. The spectral positions of the passbands of the Fabry-Perot interferometer may be scanned by varying the distance between the mirrors of the Fabry-Perot interferometer. The distance between the mirrors may be changed e.g. by changing the voltage of one or more actuators of the Fabry-Perot interferometer. Consequently, the spectral scale of the hyperspectral camera may depend on a relation between the voltages and the spectral positions of the passbands of the Fabry-Perot interferometer. Said relation may be expressed e.g. by a voltage calibration curve. The hyperspectral camera may sense the reflection spectral peaks of various selected wavelengths, and the hyperspectral camera may adjust its voltage calibration curve accordingly.

The calibration sample may be delivered e.g. together with the spectral imaging device, e.g. in the same package.

The calibration sample may also be delivered to a user separately e.g. via a postal service.

BRIEF DESCRIPTION OF THE DRAWINGS

In the following examples, several variations will be described in more detail with reference to the appended drawings, in which FIG. 8d shows, by way of example, providing an indication about the orientation of the spectral imaging device, in a situation where the optical axis of the spectral imaging device is parallel with the direction of gravity, FIG. 8e shows, by way of example, providing an indication about the orientation of the spectral imaging device, in a situation where the optical axis of the spectral imaging device is not parallel with the direction of gravity.

DETAILED DESCRIPTION

Figure 1:
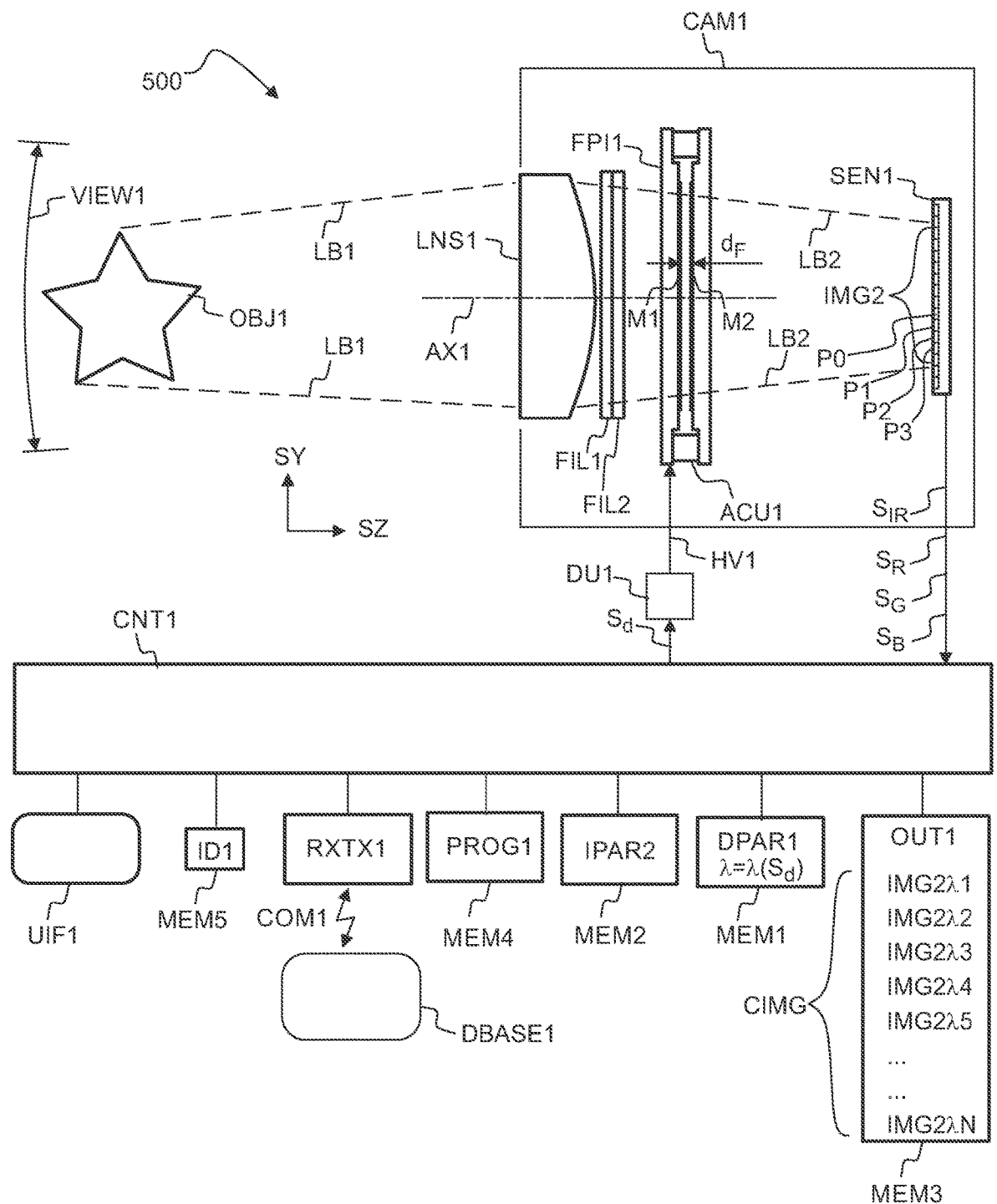
FIG. 1 shows, by way of example, in a side view, a spectral imaging device.

Referring to FIG. 1, a spectral imaging device 500 may comprise an image sensor SEN1 to capture spectral images IMG2λ1, IMG2λ2, . . . IMG2λN of an object OBJ1. The spectral imaging device 500 may also be called e.g. as a hyperspectral camera or as a spectral imager. The spectral imaging device 500 may be a mobile device. The spectral imaging device 500 may comprise imaging optics LNS1 to form the spectral images IMG2λ1, IMG2λ2, . . . IMG2λN on the image sensor SEN1 by focusing light LB1 received from the object OBJ1. The spectral imaging device 500 may comprise a scanning Fabry-Perot interferometer FPI1 to provide one or more passbands (PB1) for capturing the spectral images IMG2λ1, IMG2λ2, . . . IMG2λN. Capturing several spectral images may comprise scanning the Fabry-Perot interferometer FPI1, by varying the distance between mirrors M1, M2 of the Fabry-Perot interferometer FPI1.

The Fabry-Perot interferometer FPI1 may operate as an adjustable optical filter for forming filtered light LB2 from light LB1 received from the object OBJ1. The combination of the imaging optics LNS1 and the Fabry-Perot interferometer FPI1 may provide focused filtered light LB2 to the image sensor SEN1.

Each spectral image IMG2λ1, IMG2λ2, . . . IMG2λN may represent a (different) selected spectral band filtered from the spectrum of the light LB1 received from the object OBJ1. A first spectral image IMG2λ1 may represent a spectral band at a first spectral position $\lambda_1$. A second spectral image IMG2λ2 may represent a spectral band at a second different spectral position $\lambda_2$. The first spectral image IMG2λ1 may be captured when a passband PB1 of the Fabry-Perot interferometer FPI1 is at the first spectral position $\lambda_1$. The second spectral image IMG2λ2 may be captured when a passband PB1 of the Fabry-Perot interferometer FPI1 is at the second spectral position $\lambda_2$.

The image sensor SEN1 may comprise a plurality of light detector pixels P0, P1, P2, P3 arranged in a two-dimensional array. For example, the sensor SEN1 may comprise a plurality of first detector pixels P1 to detect red light (R). The sensor SEN1 may comprise a plurality of second detector pixels P2 to detect green light (G). The sensor SEN1 may comprise a plurality of third detector pixels P3 to detect blue light (B). The image sensor SEN1 may be an RGB image sensor.

Yet, the sensor SEN1 may further comprise a plurality of fourth detector pixels P0 to detect infrared light (IR). The signals of the detector pixels P0, P1, P2, P3 may obtained from the sensor SEN1 as signals $S_{IR}$, $S_R$, SG, $S_B$. The spectral images IMG2λ1, IMG2λ2, ... IMG2λN may be two-dimensional images.

The imaging optics LNS1 may comprise e.g. one or more lenses. The imaging optics LNS1 may have an optical axis AX1. The imaging optics LNS1 may optionally be e.g. telecentric optics or afocal optics to limit maximum inclination of light rays passing through the Fabry-Perot interferometer FPI1.

The device 500 may comprise one or more spectral filters FIL1, FIL2 for defining a minimum wavelength and a maximum wavelength of the measurement range of the device 500.

An optics unit CAM1 of the spectral imaging device 500 may comprise the optical components LNS1, FIL1, FIL2, FPI1, SEN1.

The spectral imaging device 500 may comprise a control unit CNT1 for controlling operation of the device 500. The control unit CNT1 may also be arranged to perform one or more data processing operations for calibrating and/or verifying operation of the device 500.

The spectral positions $\lambda_{F0}$, $\lambda_{F1}$, $\lambda_{F2}$, $\lambda_{F3}$, of passbands PB0, PB1, PB2, PB4 of the interferometer FPI1 may be changed by changing the distance de between semi-transparent mirrors M1, M2 of the interferometer FPI1. The interferometer FPI1 may comprise one or more actuators ACU1 for changing the distance de between the mirrors M1, M2. The spectral positions of the passbands of the interferometer FPI1 may be set according to a control signal $S_d$. For example, the interferometer FPI1 may comprise a driving unit DU1 to generate a driving voltage HV1 according to the control signal $S_d$, wherein the driving voltage HV1 may be arranged to drive the one or more actuators ACU1. In an embodiment, the mirror M1 and/or M2 may be arranged to operate as a part of the actuator ACU1. For example, a portion of the first mirror M1 may operate as a first electrode of an electrostatic actuator ACU1, and a portion of the second mirror M2 may operate as a second electrode of the electrostatic actuator ACU1.

The spectral imaging device 500 may comprise a user interface UIF1 for providing information to a user and/or for receiving user input from the user. The user interface UIF1 may be e.g. a touch screen.

The spectral imaging device 500 may comprise an identifier ID1 to specify the identity of the spectral imaging device 500. The identifier ID1 may be stored e.g. in a computer-readable read-only memory MEM5 of the device 500.

The spectral imaging device 500 may comprise a communication unit RXTX1 to receive and/or transmit data e.g. via wireless communication COM1. The spectral imaging device 500 may communicate e.g. with a database DBASE1 e.g. via the Internet.

The spectral imaging device 500 may comprise a memory MEM4 for storing computer program code PROG1. The computer program code PROG1, when executed by one or more data processors (e.g. CNT1) of the device 500 may cause the device 500 e.g. to capture spectral images, to perform calibration and/or to enable a functionality.

The spectral imaging device 500 may comprise a memory MEM2 for storing spectral intensity calibration data IPAR2. Signal values $S_{IR}$, $S_R$, SG, $S_B$ obtained from the image sensor SEN1 may be optionally converted into calibrated spectral intensity values by using the spectral intensity calibration data IPAR2.

The spectral imaging device 500 may comprise a memory MEM1 for storing spectral scale calibration data DPAR1. The spectral scale calibration data DPAR1 may specify a relation, which associates control signal values Sa with actual wavelengths λ. The spectral scale calibration data DPAR1 may be expressed as a function $\lambda(S_d)$, which specifies a relation, which associates values of a control parameter ($S_d$) of the Fabry-Perot interferometer (FPI1) with actual spectral positions (λ).

The control parameter Sa may be a control parameter of an actuator ACU1 of the Fabry-Perot interferometer FPI1. Alternatively, the control parameter $S_d$ may be indicative of a measured distance de between the mirrors (M1, M2) of the Fabry-Perot interferometer FPI1. The Fabry-Perot interferometer FPI1 may optionally comprise e.g. a capacitive sensor for measuring the distance $d_F$ between the mirrors (M1, M2), and the sensor may provide the control parameter Sa as an output indicative of the measured distance $d_F$.

The spectral imaging device 500 may provide an output OUT1. The output OUT1 may comprise e.g. detector signals $S_R$, SG, $S_B$, $S_{IR}$ and/or intensity values determined from the detector signals $S_R$, SG, $S_B$, $S_{IR}$. The spectral imaging device 500 may be arranged to obtain detector signal values $S_R$, SG, $S_B$, $S_{IR}$ from the image sensor SEN1, and to determine calibrated intensity values from the detector signal values $S_R$, SG, $S_B$, $S_{IR}$ by using calibration data (DAPR1, IPAR2). In particular, detector pixel signal values $S_R$, SG, $S_B$, $S_{IR}$ may be converted e.g. into one or more calibrated spectral images IMG2λ1, IMG2λ2, ... IMG2λN by using the calibration data (DAPR1, IPAR2).

The spectral imaging device 500 may comprise a memory MEM3 for storing captured spectral images IMG2λ1, IMG2λ2, ... IMG2λN. The spectral image IMG2λ1 may be a two-dimensional image of the object OBJ1, which represents a spectral component at first wavelength (e.g. λ1). The spectral image IMG2λ2 may be a two-dimensional image of the object OBJ1, which represents a spectral component at a second different wavelength (e.g. λ2). The optical image IMG2 may simultaneously cover a plurality of detector pixels P1, P2 in order to analyze spatial variations of optical spectrum at different points of the two-dimensional image IMG2.

The captured spectral images IMG2λ1, IMG2λ2, ... IMG2λN may together constitute a hyperspectral cube CIMG.

SX, SY and SZ denote orthogonal directions.

The spectral imaging device 500 may have a field of view VIEW1.

Figure 2:
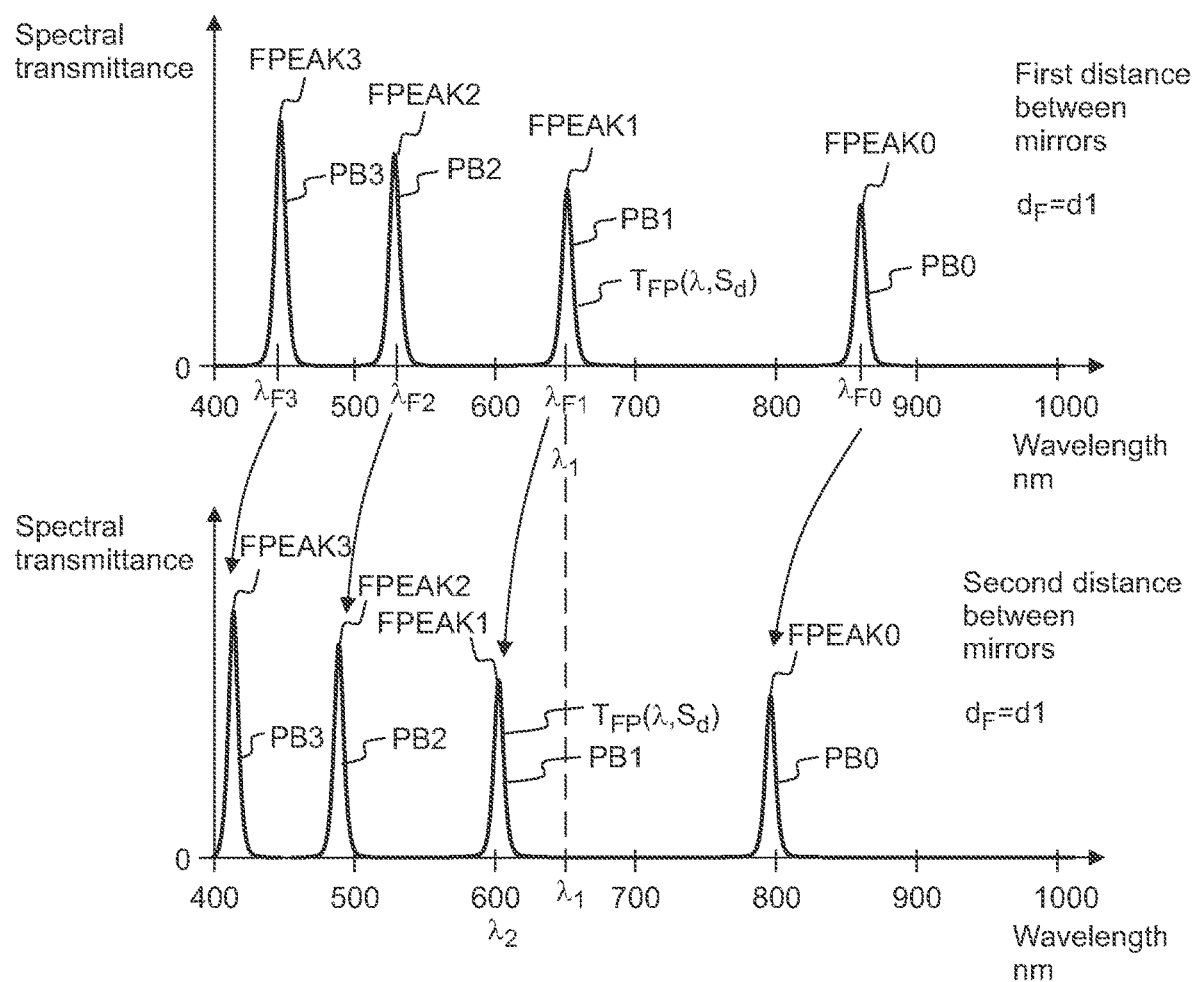
FIG. 2 shows, by way of example, changing the spectral positions of the spectral passbands of a Fabry-Perot interferometer.

FIG. 2 illustrates spectral scanning of the Fabry-Perot interferometer FPI1. The spectral passbands PB0, PB1, PB2, PB3 of the interferometer FPI1 may be at first spectral positions $\lambda_{F0}$, $\lambda_{F1}$, $\lambda_{F2}$, $\lambda_{F3}$ when the distance $d_F$ between the mirrors M1, M2 has a first value d1. Each passband has a peak FPEAK0, FPEAK1, FPEAK2, FPEAK3. For example, the peak FPEAK1 of the passband PB1 may be at a first wavelength $\lambda_1$ when the distance de is equal to d1. The distance $d_F$=d1 and the wavelength $\lambda_1$ may be associated with a first control parameter value $S_d=S_{d1}$.

The spectral positions of the peaks FPEAK1, FPEAK2, FPEAK3 may be shifted by changing the distance $d_F$.

The spectral passbands PB0, PB1, PB2, PB3 of the interferometer FPI1 may be at second different spectral positions when the distance de between the mirrors M1, M2 has a second different value d2. The change of the distance de between the mirrors M1, M2 may be associated with a change of the control parameter $S_d$. For example, the peak FPEAK1 of the passband PB1 may be at a second wavelength $\lambda_2$ when the distance de is equal to d2. The distance $d_F = d2$ and the wavelength $\lambda_2$ may be associated with a second different control parameter value $S_d = S_{d1}$.

The passbands may define the spectral position and bandwidth for capturing the spectral images with the image sensor SEN1.

Figure 3A:
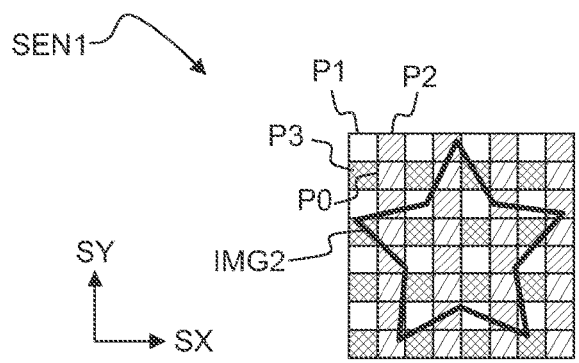
FIG. 3a shows, by way of example, in an axial view, forming an optical image on an image sensor.

Referring to FIG. 3a, the imaging optics LNS1 may form an optical image IMG2 of the object OBJ1 on the image sensor SEN1. The image sensor SEN1 may convert the optical image IMG2 into a digital image, which may be communicated to the data processor CNT1 by the signals $S_R$, $S_G$, $S_B$, $S_{IR}$. The optical image IMG2 formed on the image sensor SEN1 may represent the one or more spectral components of the light LB1 received from the object OBJ1, which spectrally selectively pass through the Fabry-Perot interferometer FPI1.

The spectral bandwidth and spectral position(s) may be defined by the spectral passbands PB0, PB1, PB2, PB3 of the interferometer FPI1.

The image sensor SEN1 may comprise a plurality of first pixels P1 to detect red light (R). The sensor SEN1 may comprise a plurality of second pixels P2 to detect green light (G). The sensor SEN1 may comprise a plurality of third pixels P3 to detect blue light (B). The sensor SEN1 may comprise a plurality of fourth pixels P0 to detect infrared light (IR).

Figure 3B:
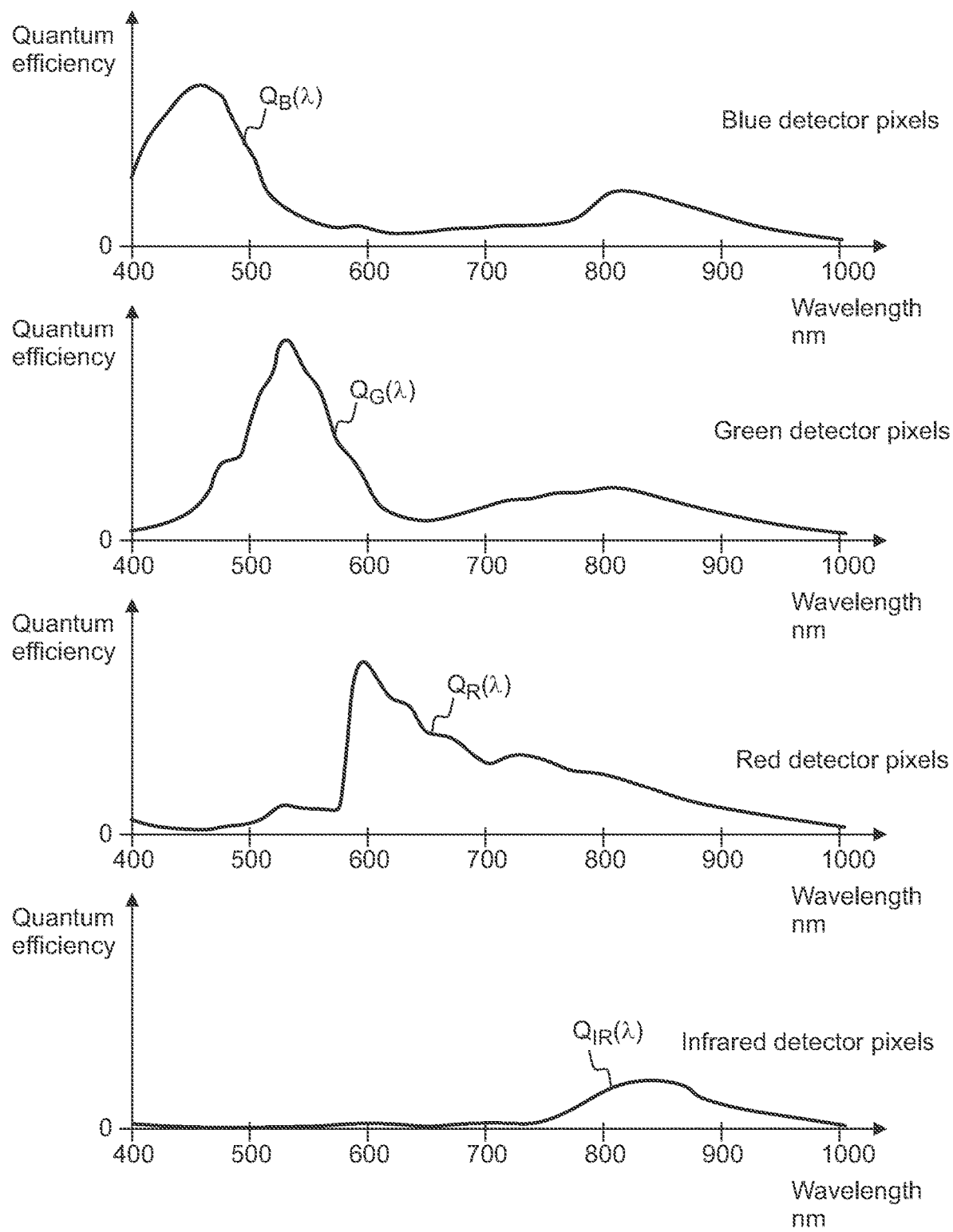
FIG. 3b shows, by way of example, spectral sensitivities of detector pixels of an image sensor.

Referring to FIG. 3b, the spectral quantum efficiency of the pixels P2 may be different from the spectral quantum efficiency of the pixels P1. The spectral quantum efficiency of the pixels P3 may be different from the spectral quantum efficiency of the pixels P1, P2. The spectral quantum efficiency of the pixels P4 may be different from the spectral quantum efficiency of the pixels P1, P2, P3. $Q_R(\lambda)$ denotes spectral quantum efficiency of the detector pixels P1. $Q_G(\lambda)$ denotes spectral quantum efficiency of the detector pixels P2. $Q_B(\lambda)$ denotes spectral quantum efficiency of the detector pixels P4. $Q_{IR}(\lambda)$ denotes spectral quantum efficiency of the detector pixels P0.

Figure 3C:
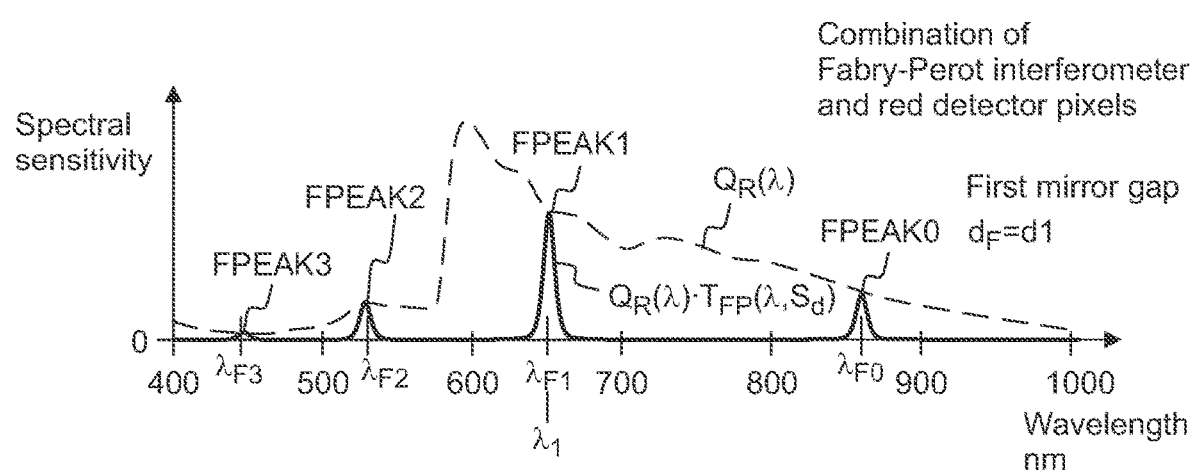
FIG. 3c shows, by way of example, spectral sensitivities of red detector pixels for light, which is transmitted through the Fabry-Perot interferometer.

Referring to FIG. 3c, the spectral quantum efficiency for the combination of the pixels P1 and the Fabry Perot interferometer FPI1 may be formed as product of the spectral transmittance function $T_{FP}(\lambda)$ of the interferometer FPI1 and the spectral quantum efficiency of the pixels P1.

Figure 4:
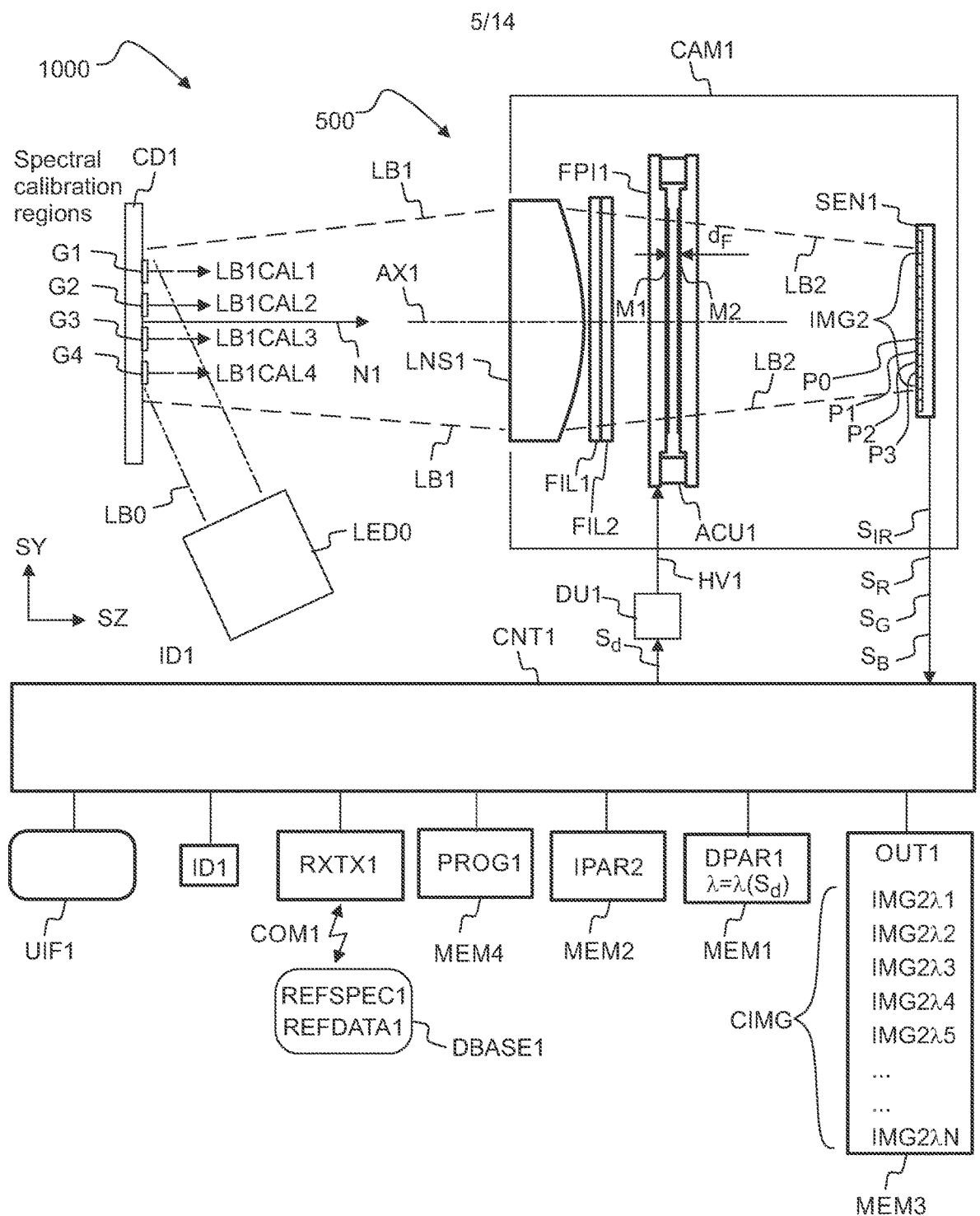
FIG. 4 shows, by way of example, an apparatus for calibrating the spectral imaging device.

Referring to FIG. 4, the calibration set-up may comprise the spectral imaging device 500, the calibration sample CD1 and an illuminating light source LED0 A calibration apparatus 1000 may comprise the calibration sample CD1, the illuminating light source LED0, and the spectral imaging device 500.

The light source LED0 may be arranged to illuminate the calibration sample CD1 with illuminating light LB0. The calibration sample CD1 may comprise calibration regions G1, G2, G3, G4 to form calibration light LB1CAL1, LB1CAL2, LB1CAL3, LB1CAL4.

The spectral imaging device 500 may be arranged to capture spectral images of the calibration sample CD1. The spectral imaging device 500 may be arranged to measure the spectrum of the calibration light LB1CAL1, LB1CAL2, LB1CAL3, LB1CAL4 by scanning the Fabry-Perot interferometer FPI1.

Figure 5A:
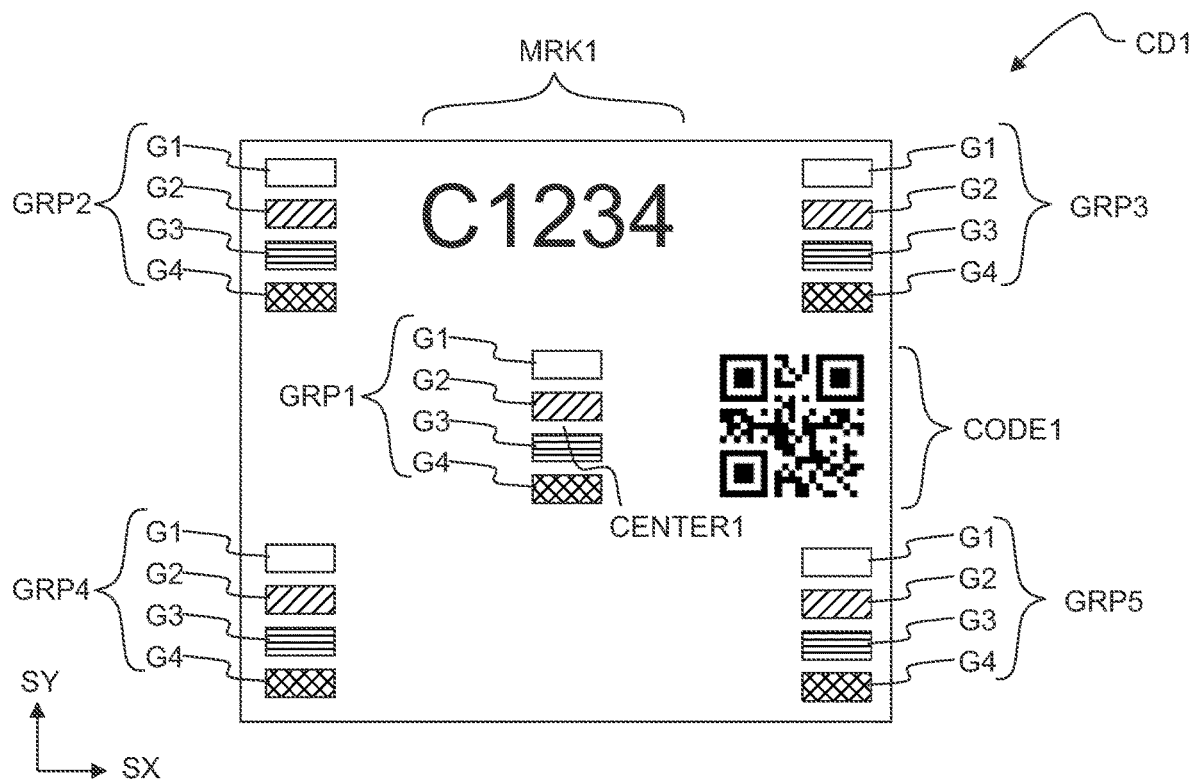
FIG. 5a shows, by way of example, in an axial view, a calibration sample, which comprises a plurality of calibration regions.

Referring to FIG. 5a, the calibration sample CD1 may comprise a plurality of calibration regions G1, G2, G3, G4 implemented on a carrier layer 50. The carrier layer 50 may also be called as a substrate. A first calibration region G1 may provide a calibration peak CALPEAK1 at a first wavelength $\lambda_{CAL1}$. A second calibration region G2 may provide a calibration peak CALPEAK2 at a second wavelength $\lambda_{CAL2}$. A third calibration region G3 may provide a calibration peak CALPEAK3 at a third wavelength $\lambda_{CAL3}$. A fourth calibration region G3 may provide a calibration peak CALPEAK4 at a fourth wavelength $\lambda_{CAL4}$.

Using two calibration peaks CALPEAK2, CALPEAK3 may e.g. allow reliable calibration and/or verification of the ratio ($\Delta\lambda/\Delta S_d$), where $\Delta S_d$ denote a change of the control signal $S_d$, and $\Delta\lambda$ denotes the change of wavelength $\lambda$, which corresponds to the change $\Delta S_d$.

Using three or more calibration peaks CALPEAK1, CALPEAK2, CALPEAK3 may e.g. allow taking into account non-linearity of the actuators of the Fabry-Perot interferometer FPI1.

The number N of different calibration peaks CALPEAK1, CALPEAK2, CALPEAK3, . . . CALPEAKN provided by the calibration sample CD1 may be e.g. in the range of 2 to 50, advantageously in the range of 4 to 20.

The number of spectrally different calibration regions of the calibration sample CD1 may be e.g. in the range of 2 to 50, advantageously in the range of 4 to 20.

The calibration sample CD1 may comprise one or more calibration regions (e.g. G1) to provide the same calibration peak (e.g. CALPEAK1). For example, the regions marked with the symbol G1 may provide the first calibration peak CALPEAK1. The regions marked with the symbol G2 may provide the second calibration peak CALPEAK2. The regions marked with the symbol G3 may provide the third calibration peak CALPEAK3. The regions marked with the symbol G4 may provide the fourth calibration peak CALPEAK4.

The regions G1, G2, G3, G4 may be spatially distinct from each other. Consequently, the spectral imaging device may measure each calibration peak CALPEAK1, CALPEAK2 separately, by using different detector pixels of the image sensor SEN1. This, in turn, may facilitate signal processing and calculations needed for the calibration.

The calibration sample CD1 may comprise a first group GRP1 of calibration regions G1, G2, G3, G4 for calibrating the spectral scale by using a central region of the image sensor SEN1. CENTER1 may denote the center of the first group GRP1.

The calibration sample CD1 may comprise a second group GRP2 of calibration regions G1, G2, G3, G4 for calibrating the spectral scale by using a peripheral region of the image sensor SEN1.

The calibration sample CD1 may comprise several groups GRP2, GRP3, GRP4, GRP5 of calibration regions G1, G2, G3, G4 for calibrating the spectral scale by using corner regions of the image sensor SEN5.

Consequently, the central area and the peripheral areas of the image sensor SEN1 may be tested or verified substantially simultaneously.

The calibration sample CD1 may comprise a first group GRP1 of calibration regions G1,G2, and a second group GRP2 of calibration regions G1,G2, wherein the method may comprise measuring spectra MSPEC1, MSPEC2 from the first group GRP1 for calibrating or verifying the spectral calibration function $\lambda(S_d)$ by using a central region of the field of view VIEW1 of the spectral imaging device 500, and wherein the method may comprise measuring spectra MSPEC1, MSPEC2 from the second group GRP2 for calibrating or verifying the spectral calibration function $\lambda(S_d)$ also by using a peripheral region of the field of view VIEW1.

The calibration sample CD1 may comprise a machine-readable code CODE1. The code CODE1 may be e.g. a two-dimensional barcode (e.g. a QR code). The code CODE1 may be linked to the calibration process.

The code CODE1 may be used e.g. to associate the calibration sample CD1 and/or an identifier of a mobile device (e.g. a smartphone) to the calibration process. The code CODE1 may allow checking whether the calibration sample CD1 having the identifier ID1 is suitable for calibrating a spectral imaging device, which has an identifier ID1. The code CODE1 may allow checking whether the calibration sample CD1 having the code CODE1 is authorized for calibrating the spectral imaging device, which has the identifier ID1. The code CODE1 may allow checking whether the spectral imaging device, which has the identifier ID1 is authorized to use the calibration sample CD1 with the code CODE1 for calibrating the spectral imaging device.

The spectral imaging device may read the code CODE1, and the apparatus 1000 may check whether the code CODE1 belongs to a list of valid codes. The list of valid codes may be stored e.g. in a database DBASE1, e.g. in an internet server. The apparatus 1000 may be arranged to enable or disable a functionality based on the result of said checking.

The apparatus 1000 may detect the time(s) when the spectral imaging device is calibrated by using the calibration sample CD1, which has the code CODE1.

The spectral imaging device may comprise a position sensor for detecting geographical position of the spectral imaging device. The position sensor may be e.g. a GPS sensor. The apparatus 1000 may detect where the spectral imaging device is calibrated by using the calibration sample CD1, which has the code CODE1. The apparatus 1000 may store the times and the locations of the calibrations e.g. in an internet server. This information may be used e.g. by the manufacturer of the spectral imaging device for optimizing the design of the spectral imaging device.

The calibration sample CD1 may optionally comprise a visually readable marking MRK1. The marking MRK1 may comprise information for the user. The marking MRK1 may comprise e.g. a logo of a manufacturer. The marking MRK1 may e.g. indicate the intended purpose of the calibration sample (e.g. "calibration sample for calibrating a spectral imager")

Figure 5B:
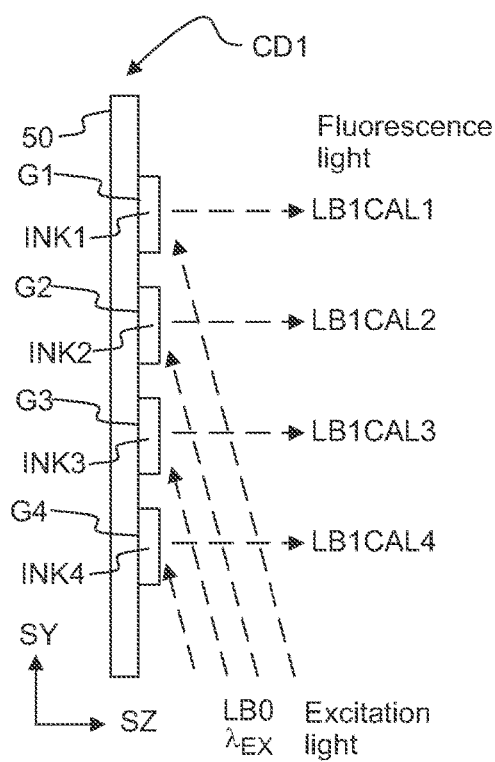
FIG. 5b shows, by way of example, calibration regions, which comprise a fluorescent substance.

Referring to FIG. 5b, the calibration regions G1, G2, G3, G4 may be implemented e.g. by using fluorescent substances INK1, INK2, INK3, INK4. A first calibration region G1 may comprise a first fluorescent substance INK1. A second calibration region G2 may comprise a second fluorescent substance INK2.

A fluorescent substance INK1 may form calibration light LB1CAL1 in a situation where the illuminating light LB0 impinges on the fluorescent substance INK1, and the illuminating light LB0 comprises one or more spectral components, which are in spectral region suitable for causing excitation of the fluorescence in the fluorescent substance INK1. The illuminating light LB0 may comprise one or more spectral components at wavelengths ($\lambda_{EX}$), which are shorter than a limit value ($\lambda_{EX,MAX}$). The illuminating light LB0 may also comprise spectral components at wavelengths ($\lambda_{EX}$), which are longer than the limit value ($\lambda_{EX,MAX}$), but those spectral components do not typically contribute to forming the calibration light LB1CAL1. The illuminating light LB0 may be obtained e.g. from a light emitting diode or from a tungsten halogen lamp. The illuminating light LB0 may be e.g. white light. The illuminating light LB0 may be e.g. blue light. The illuminating light LB0 may be e.g. ultraviolet light.

The calibration light LB1CAL1 formed by the fluorescence in the fluorescent substance INK1 has a spectral peak CALPEAK1 at a wavelength $\lambda_{CAL1}$, which may be substantially independent of the spectrum of the illuminating light LB0. The spectral peak CALPEAK1 of the formed calibration light LB1CAL1 may be at the correct stable wavelength $\lambda_{CAL1}$ in an instance where the fluorescent substance INK1 provides said calibration light LB1CAL1.

The peak wavelength $\lambda_{CAL1}$ of the light LB1CAL1 formed by the fluorescent substance INK1 does not depend on the spectrum of the illuminating light LB0, as long as the illuminating light LB0 comprises one or more spectral components suitable for exciting the fluorescence.

Each calibration region G1, G2 may comprise a fluorescent substance INK1, INK2.

In particular the calibration regions G1, G2 may comprise quantum dots inks INK1, INK2. Quantum dots ink may provide narrowband calibration light based on specific fluorescence.

The fluorescent regions may be implemented with quantum dot inks. The quantum dot ink comprises quantum dots. The "quantum dots" of the ink are small particles, which are arranged to emit light by fluorescence. The particles may emit fluorescence light when illuminated e.g. with ultraviolet light (UV). The size of the particles may be e.g. in the range of 2 to 10 nm. The particles may comprise e.g. a semiconducting material. For example, the particles may comprise or consist of cadmium telluride (CdTe). The peak wavelength of the fluorescence light may be selected e.g. by selecting the size of the particles.

A first calibration region G1 may comprise a first quantum dot ink INK1. A second calibration region G2 may comprise a second quantum dot ink INK2.

The surface of the carrier layer 50 may be optionally coated with a black layer in order to reduce or avoid disturbing reflections and background light from the carrier layer 50.

The intensity of the fluorescence light may sometimes be low when compared with ambient light. In an embodiment, the calibration sample CD1 may be positioned in a protective enclosure, e.g. in a black box, which may shield the calibration sample CD1 from the disturbing ambient light during the calibration.

Figure 5C:
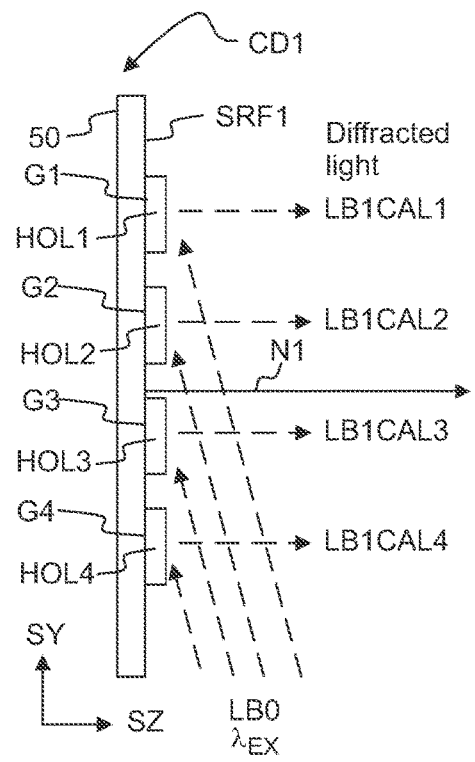
FIG. 5c shows, by way of example, calibration regions, which comprise reflection holograms.

Referring to FIG. 5c, the calibration regions G1, G2, G3, G4 may be implemented e.g. by reflection holograms HOL1, HOL2, HOLD3, HOL4. A first calibration region G1 may comprise a first reflection hologram HOL1 to provide a first calibration peak CALPEAK1. A second calibration region G2 may comprise a second reflection hologram HOL2 to provide a second calibration peak CALPEAK2. The calibration sample may comprise several calibration regions to provide calibration light at several different peak wavelengths. Each calibration region G1, G2 may comprise a reflection hologram.

The reflection hologram HOL1, HOL2 may produce a bright color, which may have a narrow spectral bandwidth at a desired spectral position. A reflection hologram HOL1, HOL2 may be implemented as a volume hologram by using e.g. a photopolymer.

When illuminated with a broadband light source, the reflection hologram may form calibration light, which has a spectral peak at a predetermined fixed wavelength, when viewed from a predetermined viewing direction. The calibration light formed by the reflection hologram may be used for precise calibration of the spectral imaging device. The reflection hologram may be illuminated with typical light sources available to a customer (e.g. LED of a household luminaire, flashlamp of a mobile phone, or the Sun).

In an embodiment, the spectral imaging device may be implemented in a mobile phone, which comprises a LED light source, wherein said LED light source may be used for illuminating the calibration sample.

The reflection hologram HOL1 may be readable and/or visible when illuminated with broadband light LB0. The broadband light LB0 may be obtained e.g. from a light emitting diode, from a tungsten halogen lamp, or from the Sun. The reflection hologram does not need to be illuminated with laser light. The reflection hologram comprises a diffractive structure to provide narrowband reflected light at a predetermined wavelength. In particular, the reflection hologram HOL1, HOL2, HOL3, HOL4 may be a volume Bragg grating. The diffractive structure comprises a plurality of alternating material layers, which are parallel with the surface of the substrate 50. The diffractive structure provides the reflected light (LB1CAL1) in a spectrally selective manner by diffracting the illuminating light LB0. The reflection hologram HOL1 diffractively selects a narrowband component from the broader spectrum of the illuminating light LB0, and the reflection hologram HOL1 may diffract said narrowband component to a predetermined viewing direction, e.g. in the direction of the surface normal N1 of the calibration sample CD1.

The reflection hologram HOL1 may form calibration light LB1CAL1 to a predetermined direction in a situation where the illuminating light LB0 impinges on the hologram HOL1 at a predetermined input angle, and the illuminating light LB0 comprises a spectral component at the peak wavelength $\lambda_{CAL1}$. The illuminating light LB0 may be broadband light. The illuminating light LB0 may be obtained e.g. from a light emitting diode or from a tungsten halogen lamp. The illuminating light LB0 may be e.g. white light. The calibration light LB1CAL1 formed by the hologram HOL1 has a spectral peak CALPEAK1 at a wavelength $\lambda_{CAL1}$, which may be substantially independent of the spectrum of the illuminating light LB0. The spectral peak CALPEAK1 of the formed calibration light LB1CAL1 may be at the correct stable wavelength $\lambda_{CAL1}$ in an instance where the reflection hologram HOL1 provides said calibration light LB1CAL1.

The reflection hologram HOL1 may be implemented such that the peak wavelength $\lambda_{CAL1}$ of the light LB1CAL1 formed by the hologram HOL1 does not depend on the direction of illuminating light LB0, and such that the peak wavelength $\lambda_{CAL1}$ of the light LB1CAL1 formed by the hologram HOL1 does not depend on the spectrum of the illuminating light LB0.

The calibration sample CD1 may be arranged to provide calibration light LB1CAL1, LB1CAL2, LB1CAL3, LB1CAL4 to a predetermined direction with respect to the calibration sample CD1. In particular, the calibration sample CD1 may be arranged to provide calibration light LB1CAL1, LB1CAL2, LB1CAL3, LB1CAL4 in the direction of the surface normal N1 of the major surface SRF1 of the calibration sample CD1. The calibration may be performed such that the optical axis AX1 of the spectral imaging device 500 is perpendicular or substantially perpendicular to the major surface SRF1 of the calibration sample CD1 during the calibration.

In an embodiment, the reflection hologram may be recorded in a photosensitive material.

In an embodiment, the holographic calibration regions may be implemented by depositing a plurality of material layers on a carrier layer 50. The diffractive structure may comprise layers of a first material and layers of a second material arranged in an alternating manner. The refractive index of the first material may be different from the refractive index of the second material. The thicknesses and the refractive indices of the layers may be selected to provide narrowband reflection at the desired wavelength.

In an embodiment, the holographic calibration regions may be implemented by depositing layers of silicon and silicon oxide on a carrier layer. In an embodiment, the holographic regions may be implemented by depositing layers of silicon and silicon nitride on a carrier layer. The holographic calibration regions may be Bragg mirrors implemented by depositing thin layers of different materials on a carrier layer. The material layers may be deposited e.g. by atomic layer deposition (ALD), by chemical vapor deposition (CVD), and/or by physical vapor deposition (PVD). The materials and the thicknesses of the layers of a calibration region may be selected to provide a desired peak wavelength and a desired bandwidth for the calibration light of the calibration region.

In an embodiment, the holographic calibration regions G1, G2, G3, G4 may be implemented by forming a gradient-index filter on the carrier layer 50. The refractive index of the gradient-index filter varies periodically and continuously as a function of the depth of the mirror coating. The gradient-index filter may also be called as a rugate filter.

The surface of the carrier layer 50 may be optionally coated with a black layer in order to reduce or avoid disturbing reflections and background light from the carrier layer 50.

In an embodiment, the machine-readable code CODE1 may be formed by one or more calibration regions G1, G2, G3, G4. For example, the machine-readable code CODE1 may be formed by a plurality of first regions G1, which are positioned to form a QR code. The code may be read e.g. by using the spectral imaging device. Implementing the machine-readable code CODE1 with the calibration regions may make it more difficult for a fraudulent person to produce a counterfeit calibration sample. Implementing the machine-readable code CODE1 with the calibration regions may make it more difficult to produce a fake code.

The calibration may be performed so that no additional optical components are positioned in the optical path between the calibration sample CD1 and the imaging optics LNS1 of the spectral imaging device 500. The calibration sample CD1 may be directly in the field of view of the spectral imaging device 500.

The calibration with the reflection holograms HOL1, HOL2, HOL3, HOL4 may be performed such that the optical axis AX1 of the spectral imaging device 500 is perpendicular or substantially perpendicular to the major surface SRF1 of the calibration sample CD1 during the calibration.

The correct angular orientation of the calibration sample CD1 with respect to the spectral imaging device 500 may be checked e.g. such that spectral imaging device 500 captures a test image of the calibration sample CD1, and compares the test image with reference image data in order to determine whether positions of features of the test image correspond to positions of features as specified by the reference image data.

Figure 5D:
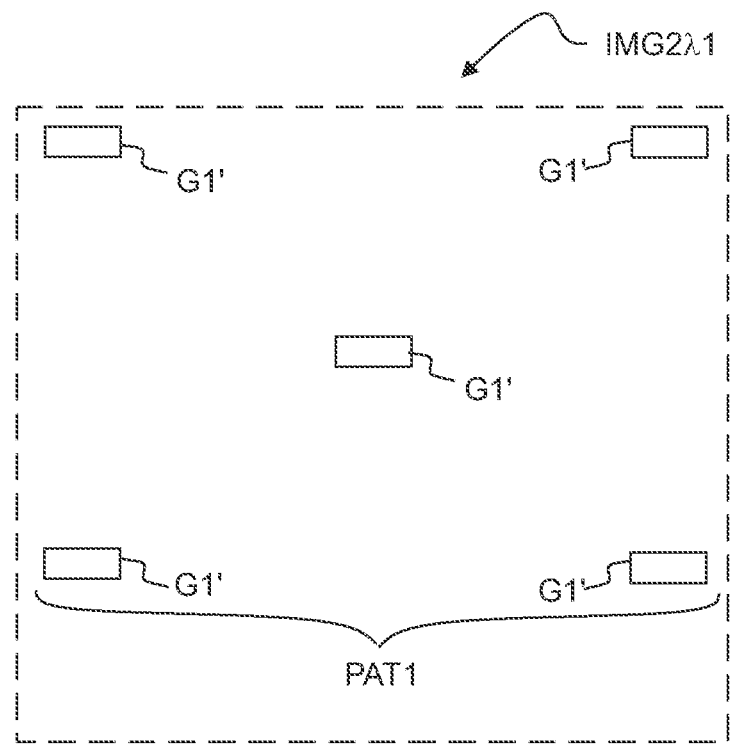
FIG. 5d shows, by way of example, a captured test image in a situation where the calibration sample is perpendicular to optical axis.

Referring to FIG. 5d, a captured test image (e.g. IMG2λ1) may comprise e.g. a pattern PAT1 formed by images G1' of the calibration regions G1. The calibration regions G1 may form e.g. a rectangular pattern on the calibration sample CD1. When the image of a rectangular pattern of the calibration sample CD1 appears as a rectangular pattern PAT1 also in the captured test image, this may be an indication that the calibration sample CD1 is perpendicular to the optical axis AX1 of the spectral imaging device 500 (i.e. the normal N1 is parallel with the axis AX1). FIG. 5d shows an example where the test image is not deformed, and the calibration sample CD1 is perpendicular to the optical axis AX1 of the spectral imaging device 500.

Figure 5E:
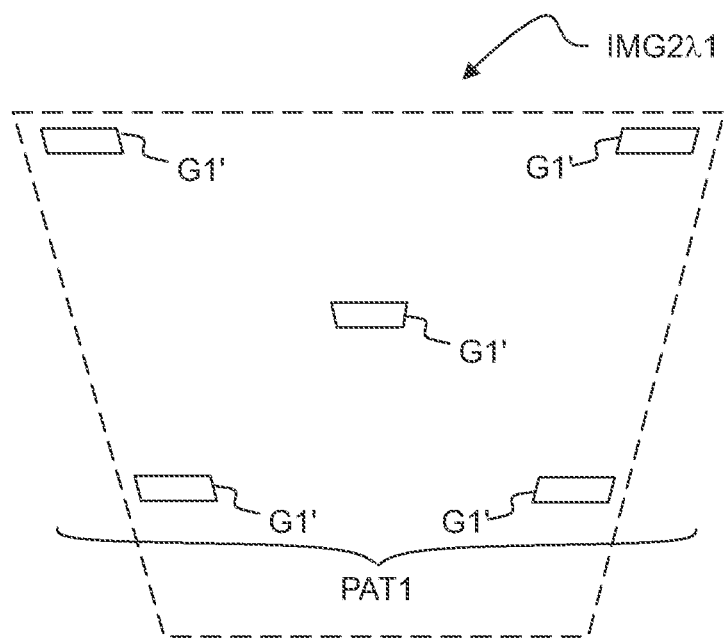
FIG. 5e shows, by way of example, a captured test image in a situation where the calibration sample is not perpendicular to optical axis.

FIG. 5e shows, by way of example, a situation where the image of the rectangular pattern of the calibration sample CD1 is deformed in the captured test image. If the pattern PAT1 is deformed in the captured test image, this may be an indication that the calibration sample CD1 is inclined with respect to the optical axis AX1 (i.e. the normal N1 is not parallel with the axis AX1). The reference image data REFDATA1 may be retrieved e.g. from the database DBASE1.

The calibration method may comprise:
capturing a test image (e.g. IMG2λ1) of the calibration sample CD1 by using the spectral imaging device 500, and
checking the angular orientation of the calibration sample CD1 with respect to the spectral imaging device 500 by comparing the captured test image of the calibration sample CD1 with reference image data REFDATA1, in order to determine whether the captured test image is deformed with respect to the reference image data or not.

In an embodiment, the spectral imaging device 500 may be arranged to prevent calibration in a situation where the calibration sample CD1 is not perpendicular to the optical axis AX1. The control unit CNT1 of the spectral imaging device 500 may be configured to prevent calibration in a situation where the calibration sample CD1 is not perpendicular to the optical axis AX1.

The spectral imaging device 500 may be arranged to enable calibration in a situation where the calibration sample CD1 is perpendicular to the optical axis AX1. The control unit CNT1 may be configured to enable the calibration in a situation where the calibration sample CD1 is perpendicular to the optical axis AX1.

The spectral image IMG2λ1 may contain images of only those features (e.g. G1), which emit or reflect light at the first wavelength λ1. Features (e.g. G2) which do not emit or reflect light at the first wavelength λ1 may be substantially invisible in the spectral image IMG2λ1.

Figure 6A:
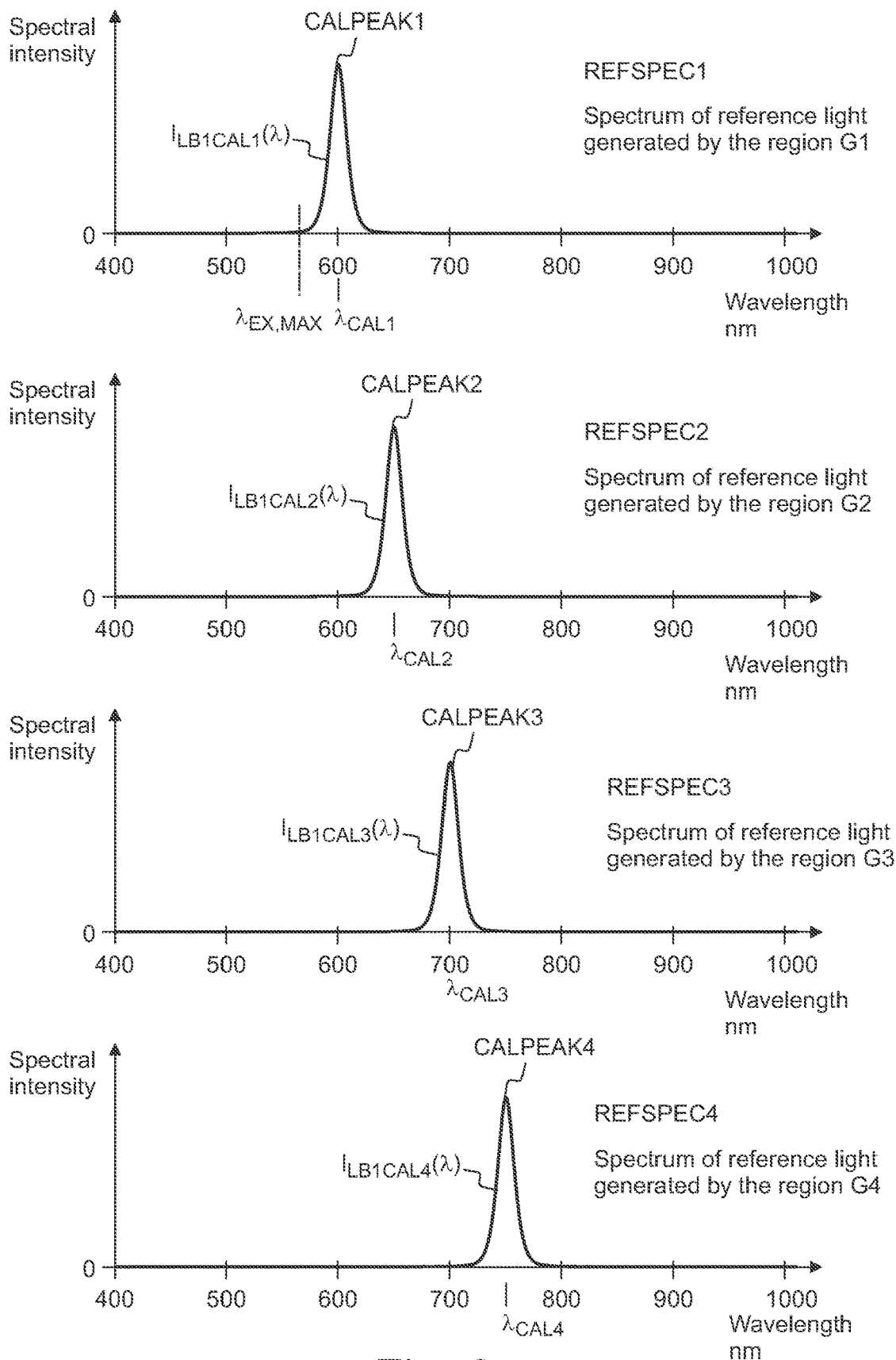
FIG. 6a shows, by way of example, spectral peaks of calibration light formed by the calibration regions.

Referring to FIG. 6a, the first calibration region(s) G1 may form first calibration light LB1CAL1, which has a first reference spectrum REFSPEC1. The first calibration light LB1CAL1 may have a spectral peak CALPEAK1 at a peak wavelength $\lambda_{CAL1}$. The first calibration light LB1CAL1 may have a spectral intensity distribution $I_{LB1CAL1}(\lambda)$.

The second calibration region(s) G2 may form second calibration light LB1CAL2, which has a second reference spectrum REFSPEC2. The second calibration light LB1CAL2 may have a spectral peak CALPEAK2 at a peak wavelength $\lambda_{CAL2}$. The second calibration light LB1CAL2 may have a spectral intensity distribution $I_{LB1CAL2}(\lambda)$.

The third calibration region(s) G3 may form third calibration light LB1CAL3, which has a third reference spectrum REFSPEC3. The third calibration light LB1CAL3 may have a spectral peak CALPEAK3 at a peak wavelength $\lambda_{CAL3}$. The third calibration light LB1CAL3 may have a spectral intensity distribution $I_{LB1CAL3}(\lambda)$.

The fourth calibration region(s) G4 may form fourth calibration light LB1CAL4, which has a fourth reference spectrum REFSPEC4. The fourth calibration light LB1CAL4 may have a spectral peak CALPEAK4 at a peak wavelength $\lambda_{CAL4}$. The fourth calibration light LB1CAL4 may have a spectral intensity distribution $I_{LB1CAL4}(\lambda)$.

Figure 6B:
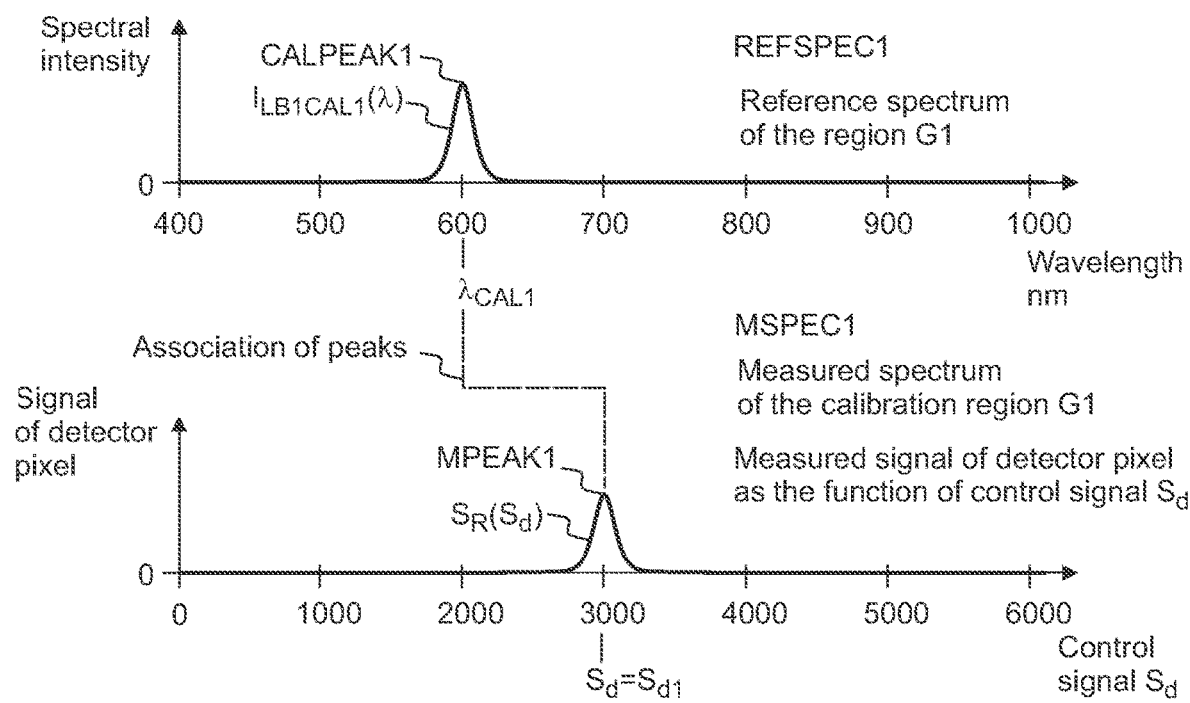
FIG. 6b shows, by way of example, associating a spectral peak of a first reference spectrum with a peak of a first measured spectrum.

Referring to FIG. 6b, the spectral imaging device 500 may be arranged to measure a spectrum MSPEC1 of the first calibration light LB1CAL1. The spectrum MSPEC1 may be measured e.g. by recording the signal $S_R(S_d)$ of the detector pixel(s) P1 as a function of the control parameter $S_d$. The measured spectrum MSPEC1 may have a peak MPEAK1 at a first control parameter value $S_d=S_{d1}$. The first control parameter value $S_{d1}$ may be associated with a first distance $d_F=d1$ between the mirrors M1, M2.

Figure 6C:
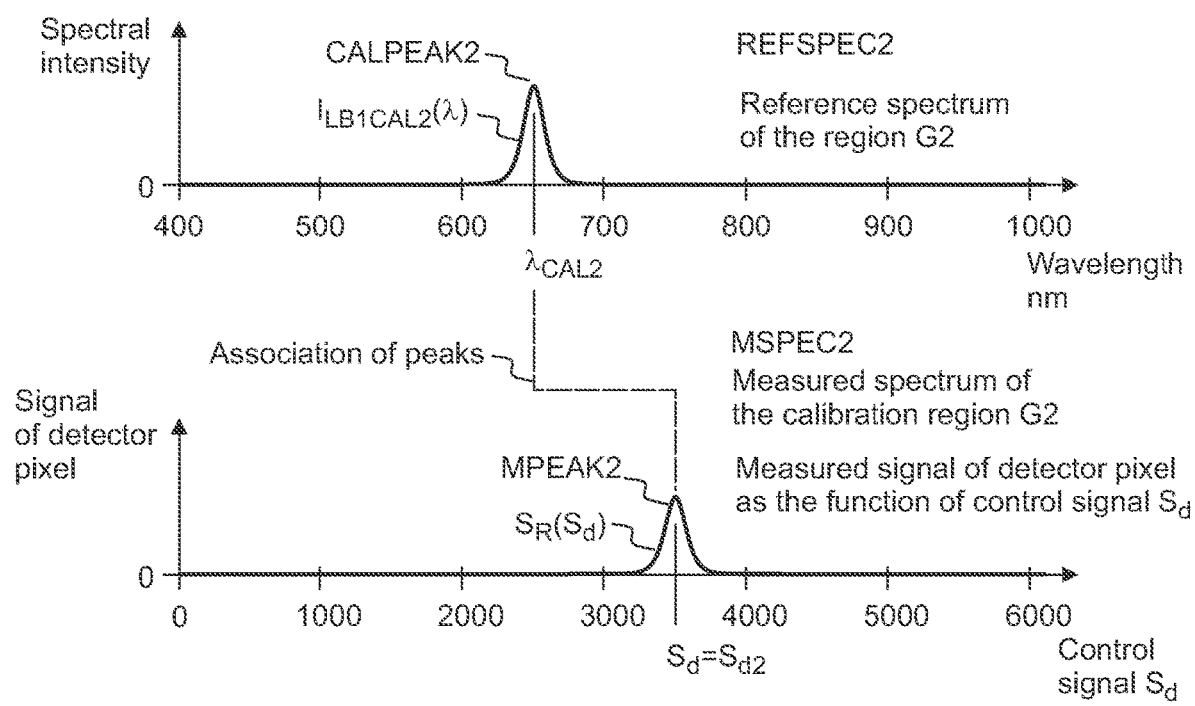
FIG. 6c shows, by way of example, associating a spectral peak of a second reference spectrum with a peak of a second measured spectrum.

Referring to FIG. 6c, the spectral imaging device 500 may be arranged to measure a spectrum MSPEC2 of the second calibration light LB1CAL2. The spectrum MSPEC2 may be measured e.g. by recording the signal $S_R(S_d)$ of the detector pixel(s) P1 as a function of the control parameter $S_d$. The measured spectrum MSPEC2 may have a peak MPEAK2 at a second control parameter value $S_d=S_{d2}$. The second control parameter value $S_{d2}$ may be associated with a second distance $d_F=d2$ between the mirrors M1, M2.

The calibration method may comprise:
associating a first control signal value ($S_{d1}$) with the first peak wavelength (λ1) by comparing the first measured spectrum (MSPEC1) with a first reference spectrum (REFSPEC1) of the first calibration region (G1),
associating a second control signal value ($S_{d2}$) with the second peak wavelength (λ2) by comparing the second measured spectrum (MSPEC2) with a second reference spectrum (REFSPEC2) of the second calibration region (G2).

The calibration method may comprise:
determining or verifying a spectral calibration function $\lambda(S_d)$ of the spectral imaging device (500) by comparing the measured spectra (MSPEC1, MSPEC2) with reference spectra (REFSPEC1, REFSPEC2), the spectral calibration function $\lambda(S_d)$ specifying a relation, which associates values of a control parameter ($S_d$) with actual spectral positions (λ).

Referring to FIG. 6c, the spectral imaging device 500 may be arranged to measure a spectrum MSPEC3 of the third calibration light LB1CAL3. The spectrum MSPEC3 may be measured e.g. by recording the signal $S_R(S_d)$ of the detector pixel(s) P1 as a function of the control parameter $S_d$. The measured spectrum MSPEC3 may have a peak MPEAK3 at a third control parameter value $S_d=S_{d3}$. The third control parameter value $S_{d3}$ may be associated with a third distance $d_F=d3$ between the mirrors M1, M2.

The calibration method may further comprise:
associating a third control signal value ($S_{d3}$) with the third peak wavelength (λ3) by comparing the third measured spectrum (MSPEC3) with the reference spectrum (REFSPEC3) of the third calibration region (G3).

The calibration method may further comprise:
determining or verifying a spectral calibration function $\lambda(S_d)$ of the spectral imaging device (500) by comparing the measured spectra (MSPEC3) with the reference spectrum (REFSPEC3).

Figure 6D:
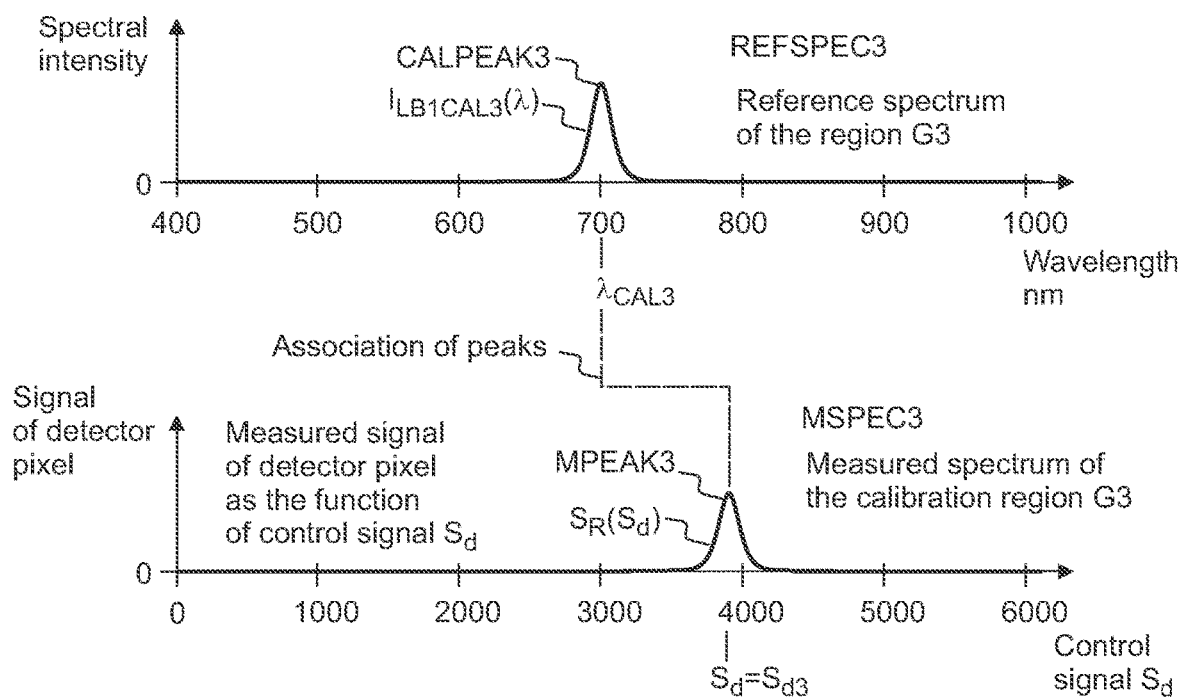
FIG. 6d shows, by way of example, associating a spectral peak of a third reference spectrum with a peak of a third measured spectrum.
Figure 6E:
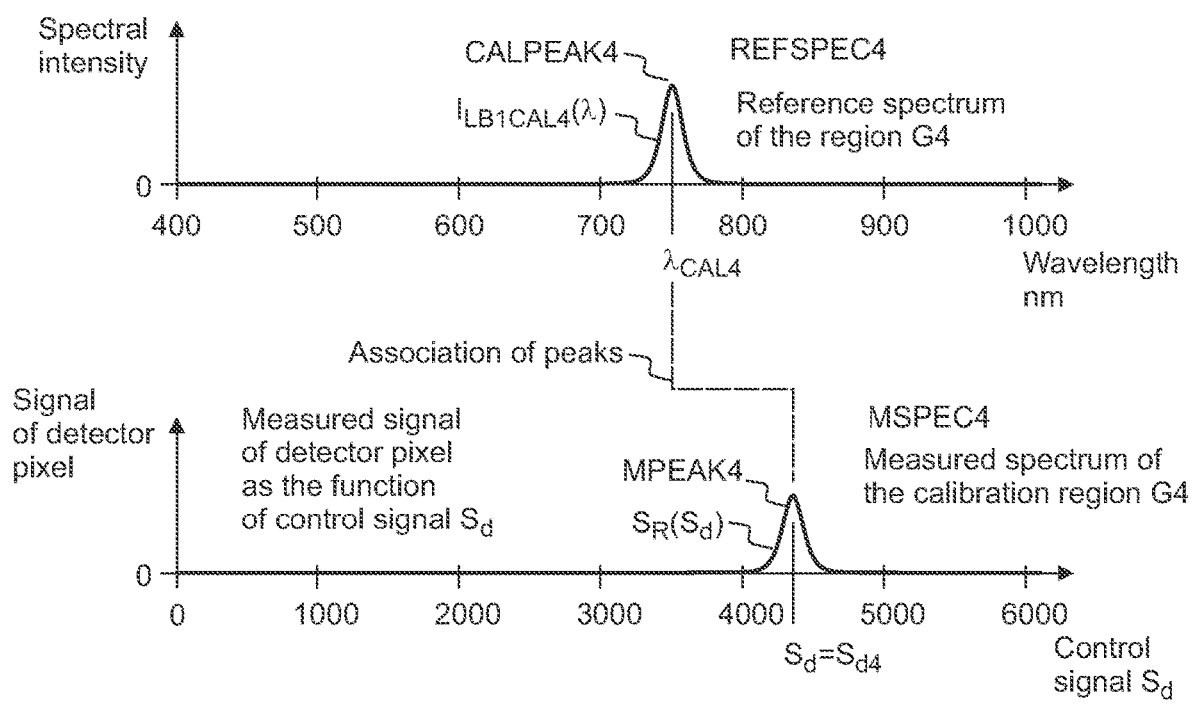
FIG. 6e shows, by way of example, associating a spectral peak of a fourth reference spectrum with a peak of a fourth measured spectrum.

Referring to FIG. 6d, the spectral imaging device 500 may be arranged to measure a spectrum MSPEC4 of the fourth calibration light LB1CAL4. The spectrum MSPEC4 may be measured e.g. by recording the signal $S_R(S_d)$ of the detector pixel(s) P1 as a function of the control parameter $S_d$. The measured spectrum MSPEC4 may have a peak MPEAK4 at a fourth control parameter value $S_d=S_{d4}$. The fourth control parameter value $S_{d4}$ may be associated with a fourth distance $d_F=d4$ between the mirrors M1, M2.

The calibration method may further comprise:
associating a fourth control signal value ($S_{d4}$) with the fourth peak wavelength (λ4) by comparing the fourth measured spectrum (MSPEC4) with the reference spectrum (REFSPEC4) of the fourth calibration region (G4).

The calibration method may further comprise:

determining or verifying a spectral calibration function $\lambda(S_d)$ of the spectral imaging device (500) by comparing the measured spectrum (MSPEC4) with the reference spectrum (REFSPEC4).

Figure 7A:
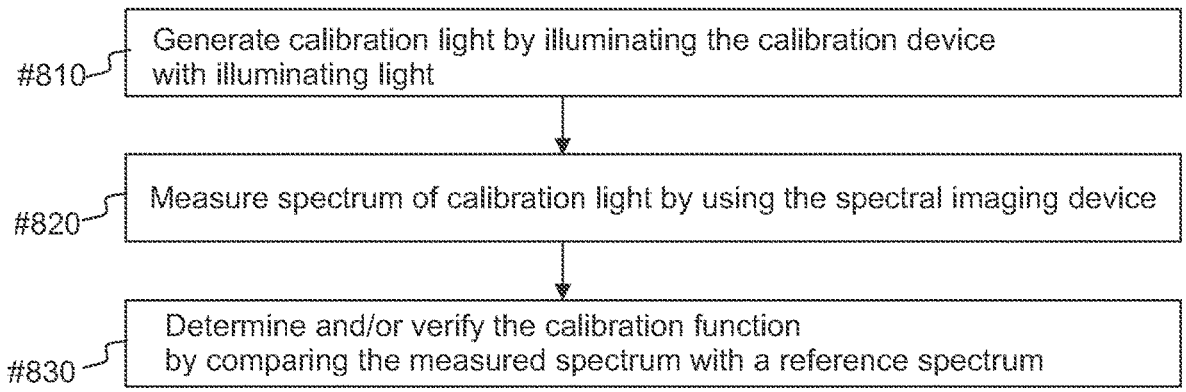
FIG. 7a shows, by way of example, method steps for calibrating spectral imaging device.

FIG. 7a shows method steps for calibration and/or verifying spectral scale of the spectral imaging device 500.

Calibration light may be formed in step #810.

The spectrum of the calibration light may be measured in step #820.

The spectral calibration may be determined and/or verified by comparing the measured spectrum with the reference spectrum of the calibration light in step #830.

Figure 7B:
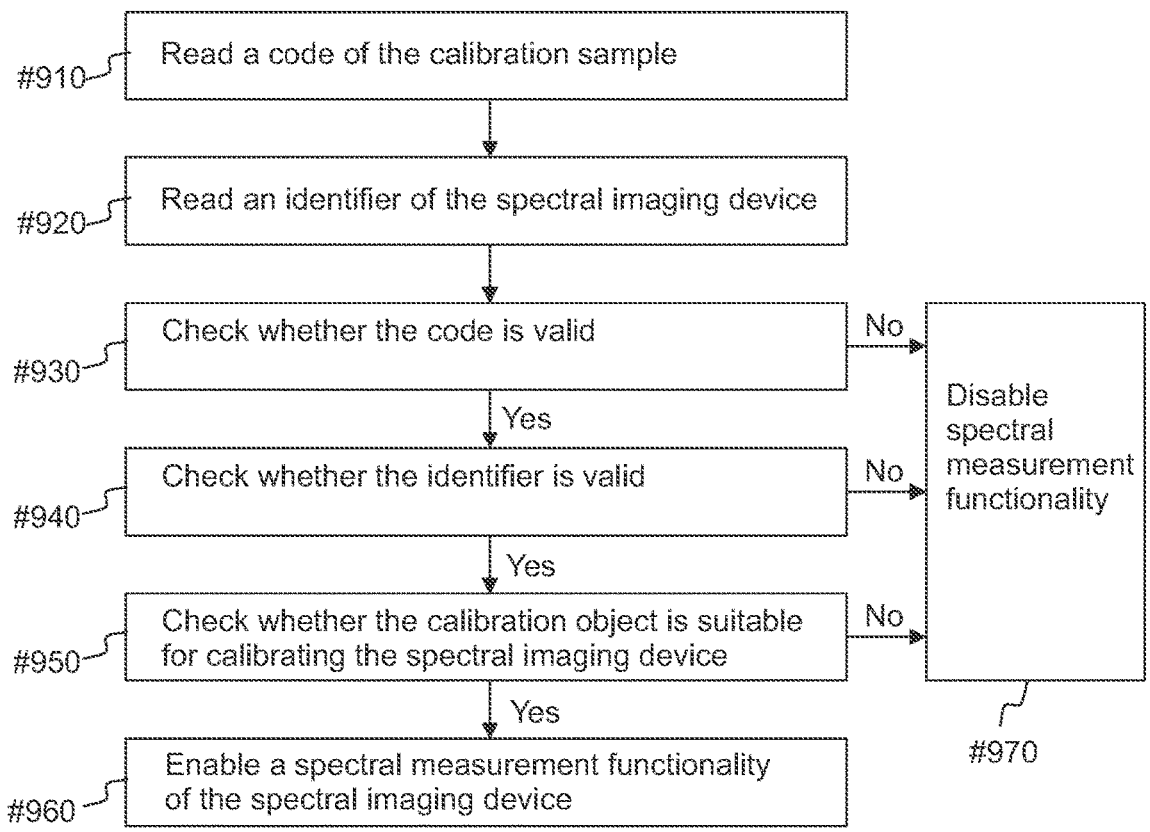
FIG. 7b shows, by way of example, method steps for enabling or disabling a functionality of a spectral imaging device.

FIG. 7b shows method steps of enabling or disabling a functionality of the spectral imaging device 500.

A code CODE1 of the calibration sample CD1 may be read in step #910.

The identifier ID1 of the spectral imaging device 500 may be retrieved in step #920.

The validity of the code CODE1 may be checked e.g. by comparing with a list of valid codes stored in a database DBASE1 (step #930).

The validity or authorization of the identifier ID1 may be checked e.g. by comparing with a list of valid identifiers stored in a database DBASE1 (step #940).

The suitability of the calibration sample CD1 for calibrating the spectral imaging device 500 may be checked e.g. by comparing the code CODE1 and/or the identifier ID1 with data stored in a database DBASE1 (step #950).

If the result of all tests is positive, the spectral imaging device 500 may be arranged to enable a spectral measurement functionality of the spectral imaging device 500 (step #960).

If the result of one or more checks is negative, the spectral imaging device 500 may be arranged to disable a spectral measurement functionality of the spectral imaging device 500 (step #970).

If the result of one or more checks is negative, the spectral imaging device 500 may be arranged to prevent a spectral measurement functionality.

If the result of one or more checks is negative, the spectral imaging device 500 may also be arranged to label measured spectral data with a message, which indicates that the data is uncalibrated.

The calibration method may enable various hyperspectral applications, which are based on a mobile hyperspectral camera. The calibration method may improve accuracy and/or reliability e.g. in one or more of the following applications: measurement of pollution, detecting contamination, skin cancer diagnosis, authentication of an item.

The method may comprise reading a code, checking whether the code belongs to a group of valid codes, and enabling or disabling a functionality of the hyperspectral camera based on the result of said checking. The code may be e.g. a two-dimensional barcode (e.g. a QR code).

The method may comprise identification of a user, e.g. for enabling or disabling a functionality of the hyperspectral camera.

Figure 8A:
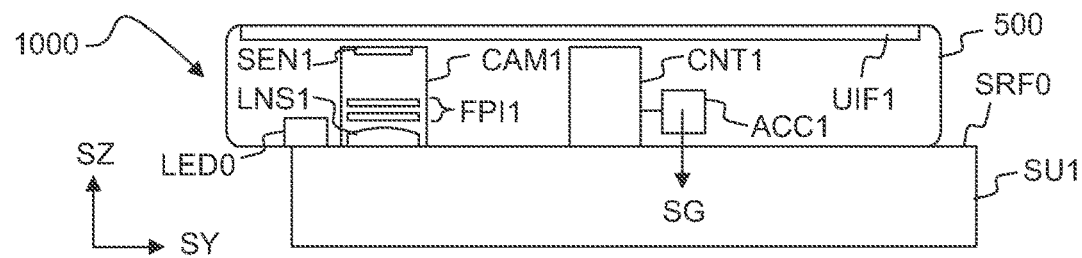
FIG. 8a shows, by way of example, checking that a supporting surface is perpendicular to the direction of gravity.
Figure 8B:
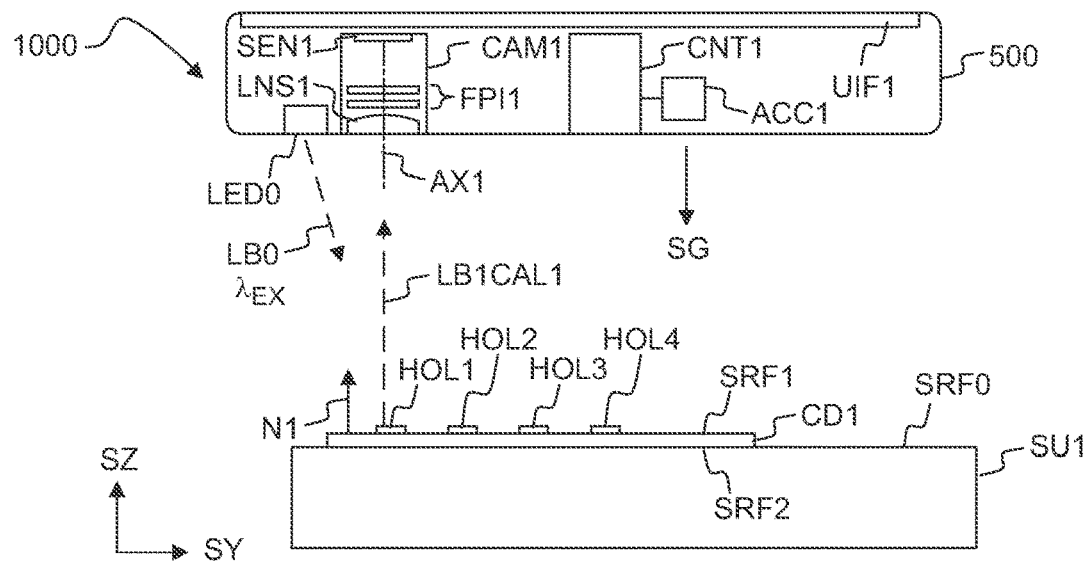
FIG. 8b shows, by way of example, measuring the orientation of the spectral imaging device with respect to the direction of gravity.
Figure 8C:
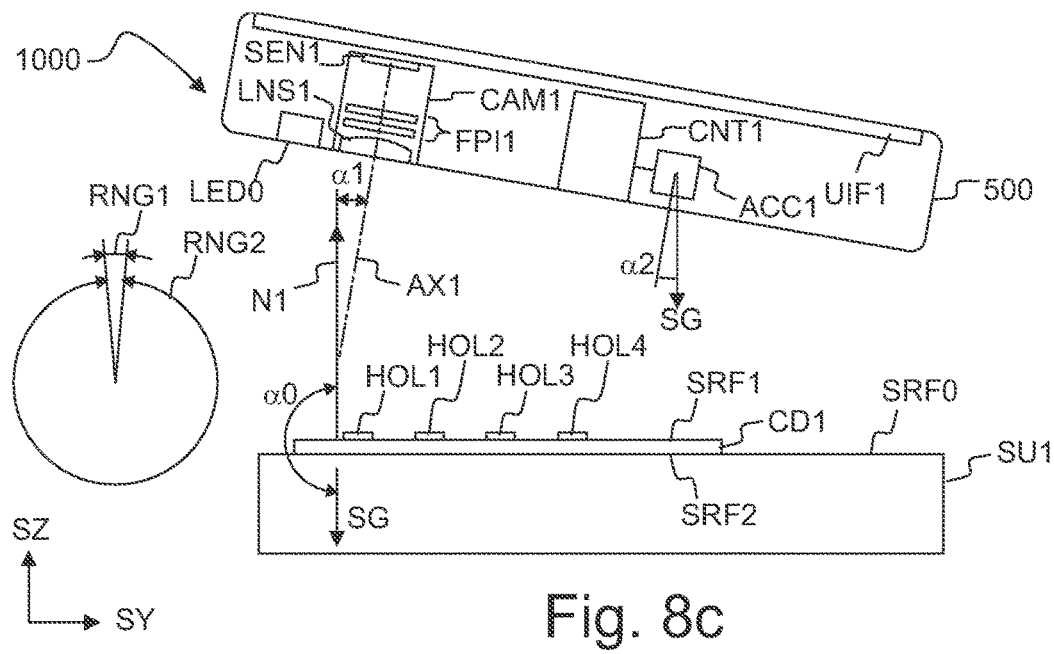
FIG. 8c shows, by way of example, a situation where the optical axis of the spectral imaging device is not parallel with the direction of gravity.

Referring to FIGS. 8a to 8c, the method may comprise checking that the calibration sample CD1 is substantially horizontal, and ensuring that the optical axis AX1 of the spectral imaging device 500 is substantially parallel with the surface normal N1 of the calibration sample CD1 when measuring the spectra MSPEC1, MSPEC2. An orientation angle $\alpha 1$ may denote the angle between the surface normal N1 and the optical axis AX1.

The method may comprise checking that the optical axis AX1 has correct orientation with respect to the surface normal of the calibration sample CD1, so as to ensure that the spectral peak CALPEAK1 has the correct wavelength ($\lambda_{CAL1}$). Tilting of the optical axis AX1 may cause a spectral shift $\Delta\lambda_{SHIFT}$ between the correct wavelength ($\lambda_{CAL1}$) and the actual wavelength of the spectral peak CALPEAK1. Tilting of the optical axis AX1 may cause a spectral shift $\Delta\lambda_{SHIFT}$ e.g. when using the holograms HOL1, HOL2, HOL3, HOL4. A large spectral shift $\Delta\lambda_{SHIFT}$ may cause erroneous calibration.

In an embodiment, the calibration may be enabled only when the orientation angle $\alpha 1$ is in an allowed range RNG1. For example, the allowed range RNG1 may be an angular range defined by the angles from −5° to +5°.

For example, the allowed range RNG1 may be an angular range defined by the angles from −1° to +1°, so as to ensure more accurate calibration.

The method may comprise measuring the orientation ($\alpha 1$) of the optical axis AX1 with respect to the surface normal N1, and checking whether the measured orientation ($\alpha 1$) is in an allowed range RNG1 for calibration.

The calibration may be disabled when the orientation $\alpha 1$ is not in the allowed range RNG1. The calibration may be disabled when the orientation $\alpha 1$ is in a forbidden range RNG2.

The method may comprise measuring the orientation of the calibration sample CD1 and/or the orientation of the spectral imaging device 500 by using a gravity sensor ACC1. An orientation angle $\alpha 0$ may denote the angle between the surface normal N1 and the direction SG of gravity. An orientation angle $\alpha 2$ may denote the angle between the optical axis AX1 and the direction SG of gravity.

In an embodiment, the calibration may be enabled only when the orientation angle $\alpha 2$ is in an allowed range RNG1. For example, the allowed range RNG1 may be an angular range defined by the angles from −5° to +5°.

For example, the allowed range RNG1 may be an angular range defined by the angles from −1° to +1°, so as to ensure more accurate calibration.

The method may comprise measuring the orientation ($\alpha 2$) of the optical axis AX1 with respect to the direction SG of gravity, and checking whether the measured orientation ($\alpha 2$) is in an allowed range RNG1 for calibration.

The calibration may be disabled when the orientation $\alpha 2$ is not in the allowed range RNG1. The calibration may be disabled when the orientation $\alpha 2$ is in a forbidden range RNG2.

Disabling the calibration may mean e.g. that the calibration parameters are not determined, that the determined (erroneous) calibration parameters are classified to be invalid and/or that use of the determined (erroneous) calibration parameters for actual measurements is prevented.

The orientation may be measured e.g. by using a gravity sensor ACC1 of the spectral imaging device 500. The gravity sensor ACC1 may have a fixed orientation with respect to the spectral imaging device 500, so that the gravity sensor ACC1 may measure the orientation of the spectral imaging device 500 with respect to the direction SG of gravity.

The gravity sensor ACC1 may be implemented e.g. by an acceleration sensor. An acceleration sensor may be arranged to sense the direction SG of gravity in steady state conditions. For example, the spectral imaging device 500 may be implemented in a mobile phone, which comprises an acceleration sensor to sense the orientation of the mobile phone with respect to the direction SG of gravity. The typical accuracy of a gravity sensor ACC1 of the mobile phone may be e.g. better than 1°, or even better than 0.2°.

Referring to FIG. 8a, the spectral imaging device 500 may be positioned on a supporting surface SRF0 of a supporting object SU1 in order to check that the supporting surface SRF0 has correct orientation ($\alpha$0) with respect to the gravity SG. At this stage, the device 500 may be temporarily brought in contact with the supporting surface SRF0. In particular, the method may comprise checking that the supporting surface SRF0 is a horizontal surface. The method may comprise checking that the supporting surface SRF0 is perpendicular to the direction SG of gravity. The supporting object SU1 may be e.g. a table, a furniture, or a floor.

The calibration sample CD1 may be subsequently positioned on the supporting surface SRF0. The supporting surface SRF0 may define the orientation of the calibration sample CD1. The calibration sample CD1 may have the same orientation as the supporting surface SRF0. The major surfaces SRF1, SRF2 of the calibration sample CD1 may be substantially parallel with each other.

Consequently, the supporting surface SRF0 and the calibration sample CD1 may have the same orientation ($\alpha$0).

In an embodiment, the calibration sample CD1 may be located between the spectral imaging device 500 and the supporting surface SRF0. The orientation of the supporting surface SRF0 and the orientation of the calibration sample CD1 may be checked by positioning the spectral imaging device 500 on the calibration sample CD1, by using the gravity sensor ACC1.

Referring to FIG. 8b, the spectral imaging device 500 may be positioned at a suitable operating distance from the calibration sample CD1. The calibration sample CD1 may be illuminated with illuminating light LB0, and the spectral imaging device 500 may measure the spectrum MSPEC1 of the first calibration light LB1CAL1 formed by the first calibration region G1, HOL1. The spectral imaging device 500 may measure the spectrum MSPEC2 of the second calibration light LB1CAL2 formed by the second calibration region G2, HOL2.

The spectra MSPEC1, MSPEC2 may be measured by using the optics unit CAM1 of the spectral imaging device 500.

The orientation of the spectral imaging device 500 with respect to the direction SG of gravity may be measured by using the gravity sensor ACC1.

The method may comprise checking that the spectral imaging device 500 has the correct orientation when measuring the spectra MSPEC1, MSPEC2. The method may comprise checking that the spectral imaging device 500 is horizontal when measuring the spectra MSPEC1, MSPEC2. The method may comprise checking that the optical axis AX1 of the spectral imaging device 500 parallel with the direction SG of gravity when measuring the spectra MSPEC1, MSPEC2. The orientation of the optical axis AX1 of the spectral imaging device 500 with respect to the direction SG of gravity may be specified e.g. by an angle $\alpha$2.

The method may comprise:
measuring the angular orientation $\alpha$2 of the optical axis AX1 of the spectral imaging device 500 by using a gravity sensor ACC1, and
checking whether the angular orientation $\alpha$2 of the optical axis AX1 is in an allowed range RNG1 for calibration.

In an embodiment, the calibration may be disabled when the orientation $\alpha$2 of the spectral imaging device 500 is not within the allowed range RNG1, when measuring the spectra MSPEC1, MSPEC2.

The illuminating light LB0 may be provided by a light source LED0. In particular, a mobile phone may comprise the spectral imaging device 500 and the light source LED0.

FIG. 8c, shows, by way of example, a situation where the spectral imaging device 500 is inclined with respect to the horizontal orientation so that the angular orientation $\alpha$1 of the calibration sample CD1 is not in the allowed range RNG1.

Figure 8F:
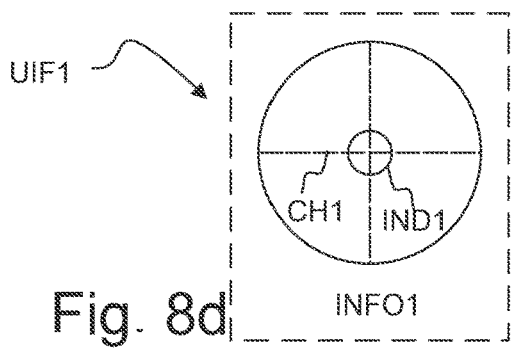
FIG. 8f shows, by way of example, method steps for checking that the calibration sample and the spectral imaging device have correct orientation for performing the calibration.
Figure 8F:
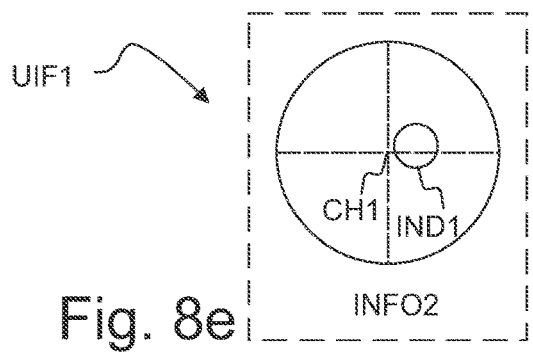
Figure 8F:
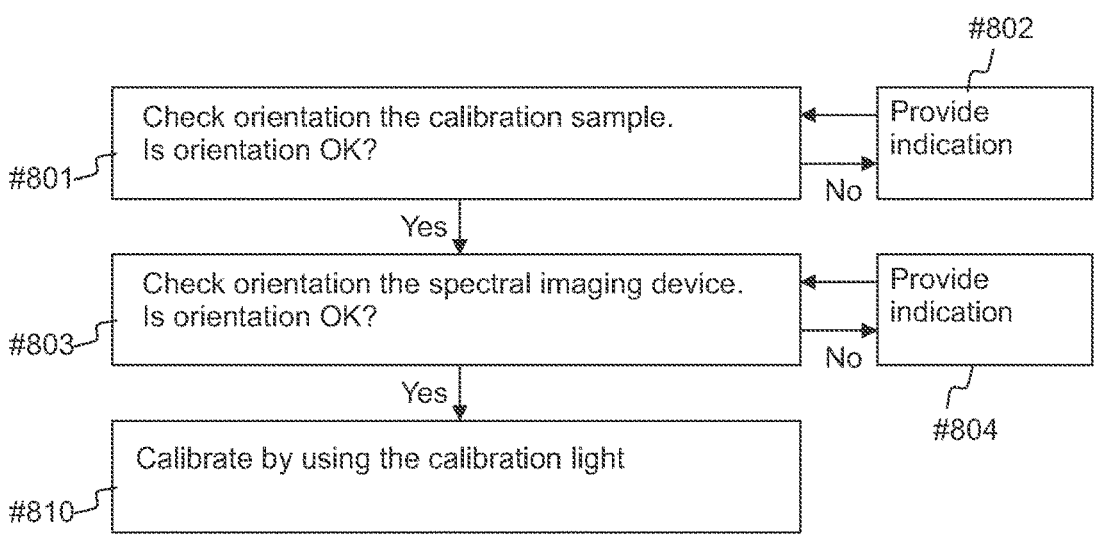

Referring to FIGS. 8d and 8f, the method may comprise providing indication IND1 about the measured orientation of the spectral imaging device 500. The spectral imaging device 500 may provide the indication IND1 based on a signal obtained from the gravity sensor ACC1.

The indication IND1 may be e.g. a visual indication and/or an audio indication. For example, the user interface UIF1 may comprise a display for displaying a visual indicator pattern IND1. The position of the movable pattern IND1 with respect to a stationary reference pattern CH1 may be indicative of the tilt angle $\alpha$2 of the spectral imaging device 500. The pattern IND1 may resemble a bubble, and the pattern CH1 may resemble a crosshair pattern and/or a circle. The patterns IND1, CH1 may e.g. reproduce the visual appearance of a builder's bubble level. The method may comprise providing an audio signal when the orientation angle $\alpha$2 is inside (or outside) the allowed range RNG1. The method may comprise displaying the measured value of the tilt angle $\alpha$2. The method may comprise displaying information INFO1, INFO2 about the measured orientation of the spectral imaging device 500. The information INFO1, INFO2 may comprise a measured value of the tilt angle $\alpha$2. Providing the indication IND1 may comprise displaying information INFO1, INFO2.

The method may comprise providing the indication IND1, so that the user may keep the spectral imaging device 500 at the correct angular position a2 with respect to the gravity SG. The user may e.g. manually keep the spectral imaging device 500 at the correct angular position $\alpha$2, based on the indication. The user may also select e.g. a suitable support for holding the spectral imaging device 500 at the correct angular position $\alpha$2, based on the indication.

The user may set the supporting surface SRF0 to a correct angular position $\alpha$0 with respect to the gravity SG, based on the indication. The user may select a supporting surface SRF0 which has a correct angular position $\alpha$0 with respect to the gravity SG, based on the indication. In particular, the user may select a supporting surface SRF0 which has horizontal orientation with respect to the gravity SG, based on the indication IND1.

The method may comprise:
checking that a supporting surface SRF0 is substantially horizontal,
positioning the calibration sample CD1 on the supporting surface SRF0,
measuring the angular orientation $\alpha$2 of the spectral imaging device 500 by using a gravity sensor ACC1,
enabling calibration only when the angular orientation $\alpha$2 of the spectral imaging device (500) is in an allowed angular range RNG1.

FIG. 8f shows, by way of example, method steps for ensuring that the orientation of the calibration sample CD1 is within the allowed range RNG1.

The orientation of the supporting surface SRF0 and/or the orientation of the calibration sample CD1 may be checked in step #801. The spectral imaging device 500 may be brough into contact with the supporting surface SRF0 or with the calibration sample CD1. The method may comprise providing indication about the measured orientation α0. The method may comprise providing the indication IND1 (step #802) until the measured orientation α0 is in an allowed range, e.g. in the range of 179° to 181°, so as to ensure that the surface normal N1 of the calibration sample CD1 is substantially vertical within 1 degree. The method may comprise providing the indication (step #802) until the supporting surface SRF0 and/or the surface SRF1 of the calibration sample CD1 is horizontal. The calibration sample CD1 may be positioned on the supporting surface SRF0 before or after the step #801.

The spectral imaging device 500 may be subsequently positioned at a suitable measuring distance from the calibration sample CD1. The orientation of the spectral imaging device 500 may be checked in step #803. The method may comprise providing indication about the measured orientation α2. The method may comprise providing the indication IND1 (step #804) in order to facilitate keeping the measured orientation α2 in an allowed range (e.g. RNG1). In particular, the method may comprise proceeding with the calibration (e.g. including step #810) only when the optical axis AX1 of the spectral imaging device 500 is substantially parallel with the direction SG of gravity. The subsequent calibration may comprise e.g. steps #810, #820, #830 (FIG. 7a).

The method may comprise:
measuring the angular orientation (α0) of a supporting surface (SRF0) by using a gravity sensor (ACC1),
positioning the calibration sample (CD1) on the supporting surface (SRF0),
measuring the angular orientation (α2) of the spectral imaging device (500) by using the gravity sensor (ACC1),
enabling calibration only when the angular orientation (α2) of the spectral imaging device (500) matches the angular orientation (α0) of the supporting surface (SRF0).

Figure 8G:
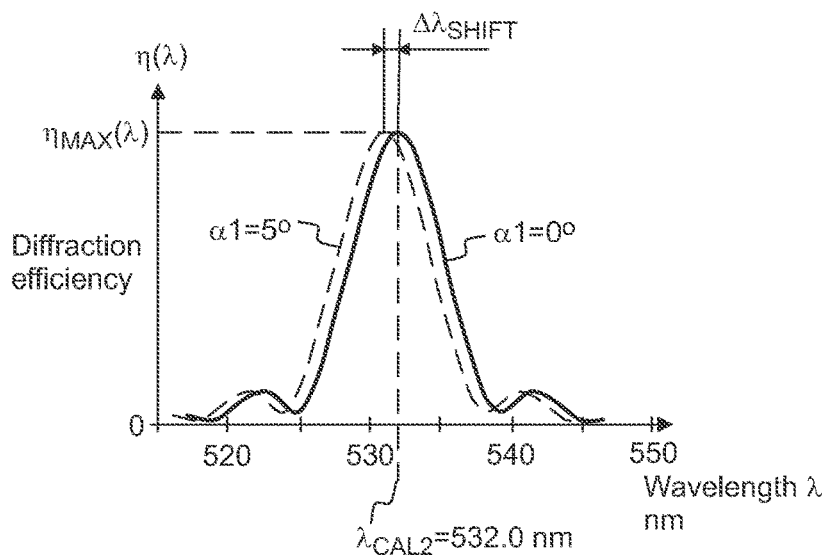
FIG. 8g shows, by way of example, a spectral shift of a calibration peak, wherein the spectral shift is caused by a tilted orientation of the optical axis with respect to the surface normal of the calibration sample.

FIG. 8g shows, by way of example, spectral diffraction efficiency η(λ) of a reflection hologram in a first situation where the reflection hologram has a correct orientation with respect to the optical axis AX1, and in a second situation where the reflection hologram is tilted by 5° with respect to the correct orientation. The spectral diffraction efficiency η(λ) at the correct orientation is illustrated by the solid curve. The spectral diffraction efficiency η(λ) at the tilted orientation is illustrated by the dashed curve. $\eta_{MAX}$ denotes the maximum value The tilted orientation may cause a spectral shift $\Delta\lambda_{SHIFT}$ of the wavelength $\lambda_{CAL2}$ of the calibration peak when the reflection hologram is tilted by 5° with respect to the correct orientation. The correct wavelength $\lambda_{CAL2}$ may be e.g. 532 nm, corresponding to the green color.

According to a diffraction calculation, the spectral shift $\Delta\lambda_{SHIFT}$ cause by the tilt angle of 5° is substantially equal to 1 nm. In other words, 5 degrees deviation may produce a 1 nm spectral shift to 531 nm (erroneous value) instead of 532 nm (correct value). The accuracy of 1 nm may be sufficient for several applications. Keeping the angular orientation α1 within the range RNG1 defined by the limits ±5° may ensure sufficient calibration accuracy.

According to a diffraction calculation, the spectral shift $\Delta\lambda_{SHIFT}$ cause by the tilt angle of 1° is substantially equal to 0.05 nm. In other words, 1 degree deviation may produce a 0.05 nm spectral shift to 531.95 nm (erroneous value) instead of 532 nm (correct value). Thus, keeping the angular orientation α1 within the range RNG1 defined by the limits ±1° may ensure better calibration accuracy.

Figure 9A:
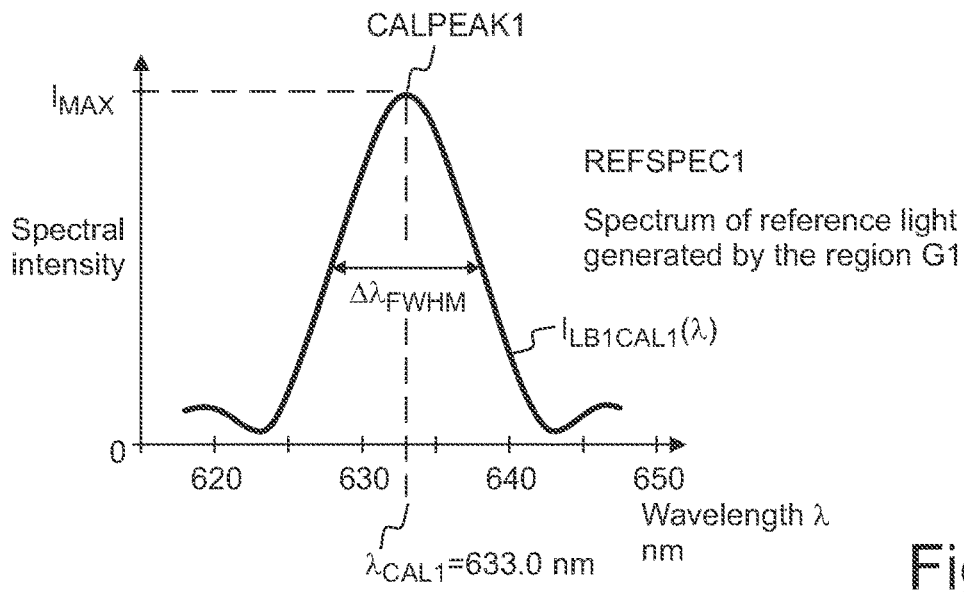
FIG. 9a shows, by way of example, a spectral peak of calibration light formed by a calibration region.

FIG. 9a shows, by way of example, spectrum REFSPEC1 of a calibration peak CALPEAK1 of calibration light LB1CAL1 formed by a first reflective hologram HOL1 (G1). The peak wavelength $\lambda_{CAL1}$ may be e.g. 633 nm corresponding to red light. IMAX denotes the maximum intensity value at the peak wavelength. $\Delta\lambda_{FWHM}$ denotes the full spectral width of the peak at half maximum.

Figure 9B:
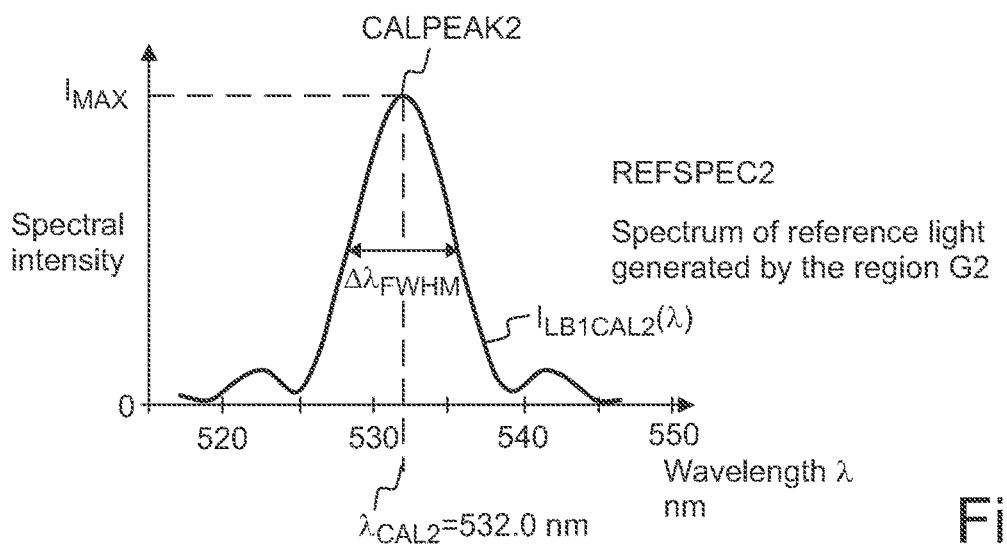
FIG. 9b shows, by way of example, a spectral peak of calibration light formed by a calibration region.

FIG. 9b shows, by way of example, spectrum REFSPEC2 of a calibration peak CALPEAK2 of calibration light LB1CAL2 formed by a second reflective hologram HOL2 (G2). The peak wavelength $\lambda_{CAL2}$ may be e.g. 532 nm corresponding to green light.

In this example, the reflection hologram is implemented by a material, which is available under the trade name Bayfol HX200. The thickness of the holographic material is 14 μm. The FWHM width $\Delta\lambda_{FWHM}$ is substantially equal to 8 nm. Increasing the thickness of the holographic material may provide a narrower peak.

Figure 9C:
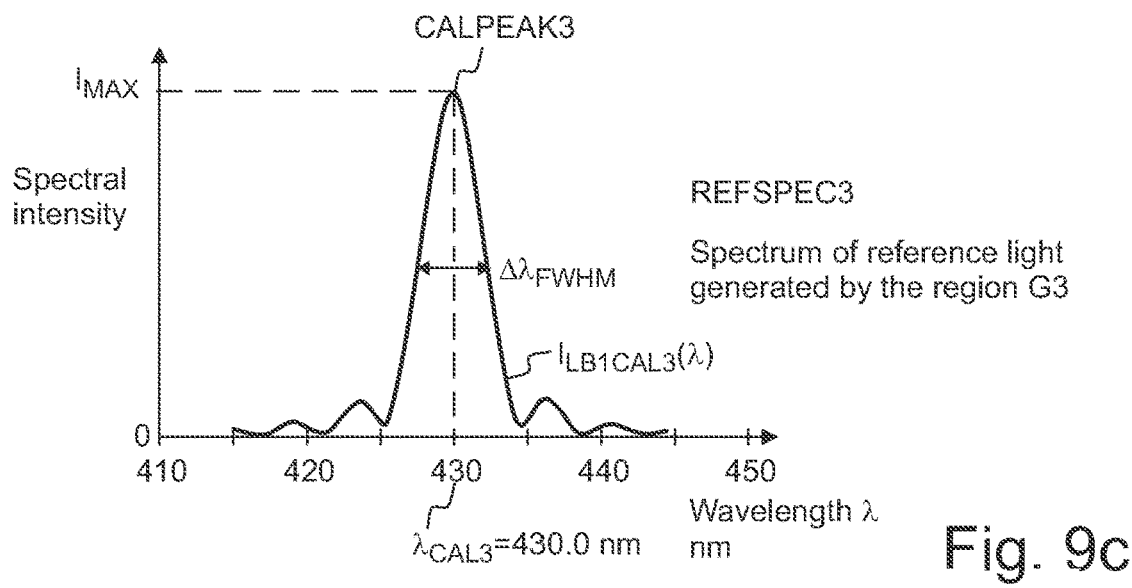
FIG. 9c shows, by way of example, a spectral peak of calibration light formed by a calibration region.

FIG. 9c shows, by way of example, spectrum REFSPEC3 of a calibration peak CALPEAK3 of calibration light LB1CAL3 formed by a third reflective hologram HOL3 (G3). The peak wavelength $\lambda_{CAL2}$ may be e.g. 430 nm corresponding to blue light.

For the person skilled in the art, it will be clear that modifications and variations of the systems, products, apparatuses, devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. A method for calibrating a spectral imaging device, the method comprising:
illuminating a calibration sample with illuminating light,
forming first calibration light and second calibration light from the illuminating light by using the calibration sample, and
measuring a first spectrum of the first calibration light by using the spectral imaging device,
measuring a second spectrum of the second calibration light by using the spectral imaging device,
wherein the calibration sample comprises a first calibration region and a second calibration region, wherein the first calibration region is arranged to form the first calibration light from the illuminating light such that the first calibration light has a first spectral peak at a first peak wavelength,
wherein the second calibration region is arranged to form the second calibration light from the illuminating light such that the second calibration light has a second spectral peak at a second peak wavelength,
wherein the first calibration region comprises a first reflection hologram, wherein the second calibration region comprises a second reflection hologram,
wherein the method further comprises:
checking that the calibration sample has correct orientation with respect to the spectral imaging device for performing calibration with the reflection holograms, and
determining or verifying a spectral calibration function of the spectral imaging device by comparing the measured spectra with reference spectra, the spectral calibration function specifying a relation, which associates values of a control parameter with actual spectral positions.

2. The method of claim 1, wherein the calibration regions have been formed on a common carrier layer.

3. The method of claim 1, wherein the illuminating light is obtained from a light emitting diode.

4. The method of claim 1, wherein the calibration sample comprises a first group of calibration regions, wherein the calibration sample comprises a second group of calibration regions, wherein the method comprises measuring spectra from the first group for calibrating or verifying the spectral calibration function by using a central region of the field of view of the spectral imaging device, and wherein the method comprises measuring spectra from the second group for calibrating or verifying the spectral calibration function also by using a peripheral region of the field of view of the spectral imaging device.

5. The method of claim 1, wherein the spectral imaging device comprises an image sensor to capture spectral images of an object, imaging optics to form the spectral images of an object on the image sensor, and a Fabry-Perot interferometer to define one or more passbands for capturing the spectral images.

6. The method of claim 1, wherein the spectral imaging device comprises a Fabry-Perot interferometer, and the spectral calibration function specifies a relation, which associates values of a control parameter of the Fabry-Perot interferometer with actual spectral positions, wherein the control parameter is a control parameter of an actuator of the Fabry-Perot interferometer, or wherein the control parameter is indicative of a measured distance between mirrors of the Fabry-Perot interferometer.

7. The method of claim 1, comprising:
associating a first control signal value with the first peak wavelength by comparing the first measured spectrum with a first reference spectrum of the first calibration region,
associating a second control signal value with the second peak wavelength by comparing the second measured spectrum with a second reference spectrum of the second calibration region.

8. The method of claim 1, wherein the calibration sample comprises a code, the method comprising:
reading the code,
reading an identifier of the spectral imaging device,
checking whether the code belongs to a group of valid codes,
checking whether the identifier belongs to a group of valid identifiers,
checking whether the calibration sample having said code is suitable for use with the spectral imaging device having said identifier, and
enabling or disabling a spectral measurement functionality based on one or more results of said checks.

9. The method of claim 1, wherein the calibration sample comprises a code, the method comprising:
reading the code, and
retrieving reference spectra from a database based on the code.

10. The method of claim 1, comprising:
measuring the angular orientation of the optical axis of the spectral imaging device by using a gravity sensor, and checking whether the angular orientation of the optical axis is in an allowed range for calibration.

11. The method of claim 1, comprising:
checking that a supporting surface is substantially horizontal,
positioning the calibration sample on the supporting surface,
measuring the angular orientation of the optical axis of the spectral imaging device by using a gravity sensor,
enabling calibration only when the angular orientation of the optical axis of the spectral imaging device is in an allowed angular range.

12. The method of claim 1, comprising:
capturing a test image of the calibration sample by using the spectral imaging device, and
checking the angular orientation of the calibration sample with respect to the spectral imaging device by comparing the captured test image of the calibration sample with reference image data, in order to determine whether the captured test image is deformed with respect to the reference image data or not.

13. An apparatus comprising:
a spectral imaging device,
a light source to illuminate a calibration sample with illuminating light, and
the calibration sample to form first calibration light and second calibration light from the illuminating light,
wherein the calibration sample comprises a first calibration region and a second calibration region, wherein the first calibration region is arranged to form first calibration light from the illuminating light such that the first calibration light has a first spectral peak at a first peak wavelength, and wherein the second calibration region is arranged to form the second calibration light from the illuminating light such that the second calibration light has a second spectral peak at a second peak wavelength,
wherein the first calibration region comprises a first reflection hologram, wherein the second calibration region comprises a second reflection hologram,
the apparatus is further configured to:
check that the calibration sample has correct orientation with respect to the spectral imaging device for performing calibration with the reflection holograms,
illuminate the calibration sample with the illuminating light,
form the first calibration light and the second calibration light from the illuminating light by using the calibration sample,
measure a first spectrum of the first calibration light by using the spectral imaging device,
measure a second spectrum of the second calibration light by using the spectral imaging device, and
determine or verify a spectral calibration function of the spectral imaging device by comparing the measured spectra with reference spectra, the spectral calibration function specifying a relation, which associates values of a control parameter with actual spectral positions.

* * * * *